US011753188B2

(12) United States Patent
Noel et al.

(10) Patent No.: US 11,753,188 B2
(45) Date of Patent: Sep. 12, 2023

(54) OPTIMIZED POWER BALANCED LOW THRUST TRANSFER ORBITS UTILIZING SPLIT THRUSTER EXECUTION

(71) Applicant: The Boeing Company, Chicago, IL (US)

(72) Inventors: Jeffrey Scott Noel, Torrance, CA (US); Andrew Henry Giacobe, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 845 days.

(21) Appl. No.: 16/527,476

(22) Filed: Jul. 31, 2019

(65) Prior Publication Data

US 2020/0198808 A1 Jun. 25, 2020

Related U.S. Application Data

(63) Continuation-in-part of application No. 16/227,659, filed on Dec. 20, 2018.
(Continued)

(51) Int. Cl.
*B64G 1/00* (2006.01)
*B64G 1/24* (2006.01)
(Continued)

(52) U.S. Cl.
CPC ............ *B64G 1/007* (2013.01); *B64G 1/242* (2013.01); *B64G 1/26* (2013.01); *B64G 1/405* (2013.01); *B64G 2001/247* (2013.01)

(58) Field of Classification Search
CPC ................................ B64G 1/007; B64G 1/242
See application file for complete search history.

(56) References Cited

U.S. PATENT DOCUMENTS 4,995,216 A 2/1991 Vansteelant
5,551,218 A 9/1996 Henderson et al.
(Continued)

FOREIGN PATENT DOCUMENTS

AU 2015222926 A1 10/2016
CA 2940652 A1 9/2015
(Continued)

OTHER PUBLICATIONS

Shaff, Sven et al., "Advanced Electric Orbit-Raising Optimization for Operational Purpose" (2015), Astos Solutions GmbH, retrieved from the Internet at: https://www.astos.de/resources?query_string=downloads, 13 pages.
(Continued)

*Primary Examiner* — Joshua J Michener
*Assistant Examiner* — Arfan Y. Sinaki
(74) *Attorney, Agent, or Firm* — Sage Patent Group

(57) ABSTRACT

A method for providing optimized power balanced low thrust transfer orbits utilizing split thruster execution to minimize an electric orbit raising duration of an apparatus includes monitoring an electric power balance on the apparatus. The method also includes firing a first thruster in response to the apparatus exiting an eclipse and based on the electric power balance. The method additionally includes firing a second thruster at a predetermined time delay after firing the first thruster based on the electric power balance. The method additionally includes ending firing one of the first thruster or the second thruster after a predetermined time duration based on the electric power balance. The method further includes ending firing another of the first thruster or the second thruster in response to the apparatus entering a next eclipse.

20 Claims, 13 Drawing Sheets

Related U.S. Application Data

(60) Provisional application No. 62/794,245, filed on Jan. 18, 2019.

(51) Int. Cl.
   *B64G 1/26* (2006.01)
   *B64G 1/40* (2006.01)

(56) References Cited

U.S. PATENT DOCUMENTS

| | | | |
|---|---|---|---|
| 5,557,510 A | 9/1996 | McIntyre et al. | |
| 5,595,360 A * | 1/1997 | Spitzer | B64G 1/405 244/171.5 |
| 5,685,505 A | 11/1997 | Meckler | |
| 5,716,029 A * | 2/1998 | Spitzer | B64G 1/405 244/171.5 |
| 5,847,520 A | 12/1998 | Theurillat et al. | |
| 6,021,979 A | 2/2000 | Bender et al. | |
| 6,031,334 A | 2/2000 | Meyer | |
| 6,081,710 A | 6/2000 | Sherman et al. | |
| 6,116,543 A * | 9/2000 | Koppel | B64G 1/002 244/164 |
| 6,181,115 B1 | 1/2001 | Perol et al. | |
| 6,237,876 B1 * | 5/2001 | Barker | B64G 1/242 244/171.1 |
| 6,341,749 B1 | 1/2002 | Ocampo | |
| 6,449,936 B1 | 9/2002 | Anstey et al. | |
| 6,543,723 B1 | 4/2003 | Oh | |
| 6,755,377 B1 | 6/2004 | Levin et al. | |
| 6,845,950 B1 * | 1/2005 | Goodzeit | B64G 1/007 701/13 |
| 6,942,186 B1 | 9/2005 | Levin et al. | |
| 7,113,851 B1 * | 9/2006 | Gelon | B64G 1/242 701/4 |
| 7,197,979 B2 | 4/2007 | Derscheid | |
| 7,246,775 B1 * | 7/2007 | Goodzeit | B64G 1/244 244/164 |
| 7,640,852 B1 | 1/2010 | Anstey et al. | |
| 7,694,504 B1 | 4/2010 | Viaud et al. | |
| 8,056,314 B1 | 11/2011 | Anstey et al. | |
| 8,152,108 B2 | 4/2012 | Becker-Irvin et al. | |
| 8,457,810 B1 | 6/2013 | Batla et al. | |
| 8,763,957 B1 | 7/2014 | Higham et al. | |
| 8,930,048 B1 | 1/2015 | Batla et al. | |
| 9,108,748 B2 | 8/2015 | Munir et al. | |
| 9,428,075 B2 | 8/2016 | Fukui et al. | |
| 2003/0062452 A1 * | 4/2003 | Oh | B64G 1/242 244/171.1 |
| 2004/0083704 A1 | 5/2004 | Lucand et al. | |
| 2004/0090195 A1 | 5/2004 | Motsenbocker | |
| 2004/0232878 A1 | 11/2004 | Couch et al. | |
| 2006/0048481 A1 | 3/2006 | Hood et al. | |
| 2008/0306700 A1 | 12/2008 | Kawam et al. | |
| 2009/0310391 A1 | 12/2009 | Becker-Irvin et al. | |
| 2011/0073714 A1 | 3/2011 | Hruby et al. | |
| 2012/0097796 A1 * | 4/2012 | Munir | B64G 1/007 244/158.6 |
| 2012/0097797 A1 * | 4/2012 | Woo | B64G 1/26 244/158.6 |
| 2012/0217348 A1 | 8/2012 | Martinez | |
| 2014/0061386 A1 | 3/2014 | Peterka, III et al. | |
| 2014/0109164 A1 | 4/2014 | Yamagishi | |
| 2015/0134175 A1 | 5/2015 | Derscheid et al. | |
| 2015/0156842 A1 | 6/2015 | Miyahara et al. | |
| 2016/0011318 A1 | 1/2016 | Cohen | |
| 2016/0050851 A1 | 2/2016 | Kraus | |
| 2016/0165803 A1 | 6/2016 | Smith | |
| 2016/0251092 A1 | 9/2016 | Cappaert et al. | |
| 2016/0290223 A1 | 10/2016 | Mills | |
| 2016/0355292 A1 | 12/2016 | Wigdahl et al. | |
| 2016/0368624 A1 * | 12/2016 | Hruby | B64G 1/405 |
| 2017/0049058 A1 | 2/2017 | Eubanks et al. | |
| 2017/0287303 A1 | 10/2017 | Lang et al. | |
| 2017/0332556 A1 | 11/2017 | Underhill | |
| 2020/0198807 A1 | 6/2020 | Mansour et al. | |
| 2020/0198810 A1 | 6/2020 | Noel et al. | |
| 2020/0198811 A1 | 6/2020 | Hahn, III et al. | |
| 2020/0361338 A1 | 11/2020 | James | |

FOREIGN PATENT DOCUMENTS

| | | |
|---|---|---|
| EP | 1059232 A2 | 12/2000 |
| EP | 3110695 A2 | 1/2017 |
| EP | 3110695 A4 | 2/2018 |
| EP | 3670360 A1 | 6/2020 |
| EP | 3672018 A1 | 6/2020 |
| FR | 2785103 A1 | 4/2000 |
| GB | 2413861 A | 11/2005 |
| KR | 20150031329 A | 3/2015 |
| KR | 20160147724 A | 12/2016 |
| RU | 2459749 C1 | 8/2012 |
| RU | 2496690 C1 | 10/2013 |
| RU | 2541512 C2 | 2/2015 |
| RU | 2585171 C1 | 5/2016 |
| RU | 2586172 C2 | 6/2016 |
| RU | 2611568 C1 | 2/2017 |
| RU | 2621694 C2 | 6/2017 |
| RU | 2661187 C1 | 7/2018 |
| WO | 2009155158 A1 | 12/2009 |
| WO | 2014021363 A1 | 2/2014 |
| WO | 2015130950 A2 | 9/2015 |
| WO | 2015130950 A3 | 11/2015 |

OTHER PUBLICATIONS

Kimbrel, Michael S. "Optimization of Electric Propulsion Orbit Raising" (Jun. 2002), Massachusetts Institute of Technology, Department of Aeronautics and Astronautics, retrieved from the Internet at: https://dspace.mit.edu/handle/1721.1/82240, 102 pages.
Extended European Search Report dated May 4, 2020 for European Patent Application No. 19202923.9, 10 pages.
Extended European Search Report dated May 18, 2020 for European Patent Application No. 19210308.3, 9 pages.
Extended European Search Report dated May 18, 2020 for European Patent Application No. 19217666.7, 6 pages.
Chetty, P.R.K et al. "Topex Electrical Power System," Aerospace Power Systems, Proceedings of the Intersociety Energy Conversion Engineering Conference, IEEE, Boston, Aug. 4-9, 1991, pp. 36-44.
European Office Action dated Apr. 29, 2022, for European Patent Application No. 19202923.9, 7 pages.
Non-Final Office Action dated Mar. 8, 2023 for U.S. Appl. No. 16/228,000, 63 pages.

* cited by examiner

OPTIMIZED POWER BALANCED LOW THRUST TRANSFER ORBITS UTILIZING SPLIT THRUSTER EXECUTION

CROSS-REFERENCE TO RELATED APPLICATIONS

This application claims benefit of U.S. Application No. 62/794,245, filed Jan. 18, 2019, and assigned to the same assignee as the present application and is incorporated herein by reference.

This application is also a continuation-in-part of U.S. patent application Ser. No. 16/227,659, entitled "Optimized Power Balanced Variable Thrust Transfer Orbits to Minimize an Electric Orbit Raising Duration," filed Dec. 20, 2018, now issued as U.S. Pat. No. 11,396,388, on Jul. 26, 2022, and assigned to the same assignee as the present application and is incorporated herein by reference.

FIELD

The present disclosure relates to spacecraft including satellites and the like, and more particularly to providing optimized power balanced low thrust transfer orbits utilizing split thruster execution.

BACKGROUND

Electric orbit raising involves moving a spacecraft, such as a satellite, from an initial injection orbit after separation from a launch vehicle to a target orbit where the spacecraft will operate during its useful life. Thrusters are used during electric orbit raising to move the spacecraft from the initial injection orbit to the target orbit. The thrusters use a propellant. The amount of thrust generated by each thruster during firing is variable and is controlled by an amount of electric power supplied to the thruster. The amount of propellant used during firing of the thruster is determined by the amount of electric power supplied. The amount of electric power and propellant used will also be dependent upon the duration of firing of the thruster each time the thruster is fired. The thrusters are also used for station-keeping once the spacecraft is in the target orbit. Accordingly, minimizing the duration of electric orbit raising and controlling electric power to the thrusters during electric orbit raising is important to preserve as much propellant as possible for station-keeping.

SUMMARY

In accordance with an embodiment, a method for providing optimized power balanced low thrust transfer orbits utilizing split thruster execution to minimize electric orbit raising of an apparatus includes monitoring an electric power balance on the apparatus during each transfer orbit of a plurality of transfer orbits of the electric orbit raising. The method also includes firing a first thruster in response to the apparatus exiting an eclipse and based on the electric power balance. The method also includes firing a second thruster at a predetermined time delay after firing the first thruster and based on the electric power balance. The method additionally includes ending firing one of the first thruster or the second thruster after a predetermined time duration based on the electric power balance. The method further includes ending firing another of the first thruster or the second thruster in response to the apparatus entering a next eclipse.

In accordance with an embodiment, an apparatus is configured for providing optimized power balanced low thrust transfer orbits utilizing split thruster execution to minimize an electric orbit raising duration of the apparatus. The apparatus includes control electronics configured to monitor an electric power balance on the apparatus during each transfer orbit of a plurality of transfer orbits of the electric orbit raising. The control electronics is also configured to fire a first thruster in response to the apparatus exiting an eclipse and based on the electric power balance. The control electronics is also configured to fire a second thruster at a predetermined time delay after firing the first thruster and based on the electric power balance. The control electronics is additionally configured to end firing one of the first thruster or the second thruster after a predetermined time duration based on the electric power balance. The control electronics is further configured to end firing another of the first thruster or the second thruster in response to the apparatus entering a next eclipse.

In accordance with an embodiment and the preceding embodiments, firing the first thruster includes firing the first thruster at a first predetermined thruster power level and firing the second thruster includes firing the second thruster at a second predetermined thruster power level.

In accordance with an embodiment and any of the preceding embodiments, the first predetermined thruster power level and the second predetermined thruster power level are about equal.

In accordance with an embodiment and any of the preceding embodiments, the first predetermined thruster power level and the second predetermined thruster power level are about a maximum thruster power level.

In accordance with an embodiment and any of the preceding embodiments, the method further includes adjusting a thruster power level of each thruster during each transfer orbit based on the electric power balance during each transfer orbit.

In accordance with an embodiment and any of the preceding embodiments, the method further includes adjusting a time duration of firing the thrusters together during each transfer orbit based on the electric power balance during each transfer orbit.

In accordance with an embodiment and any of the preceding embodiments, the method further includes determining an optimized portion of a sunlight duration of each transfer orbit during which the thrusters are fired together.

In accordance with an embodiment and any of the preceding embodiments, the method further includes firing at least one of the thrusters at least partially into the next eclipse.

In accordance with an embodiment and any of the preceding embodiments, wherein firing the first thruster includes firing more than one first thruster.

In accordance with an embodiment and any of the preceding embodiments, wherein firing the second thruster comprising firing more than one second thruster.

The features, functions, and advantages that have been discussed can be achieved independently in various embodiments or may be combined in yet other embodiments further details of which can be seen with reference to the following description and drawings.

DETAILED DESCRIPTION

Figure 1:
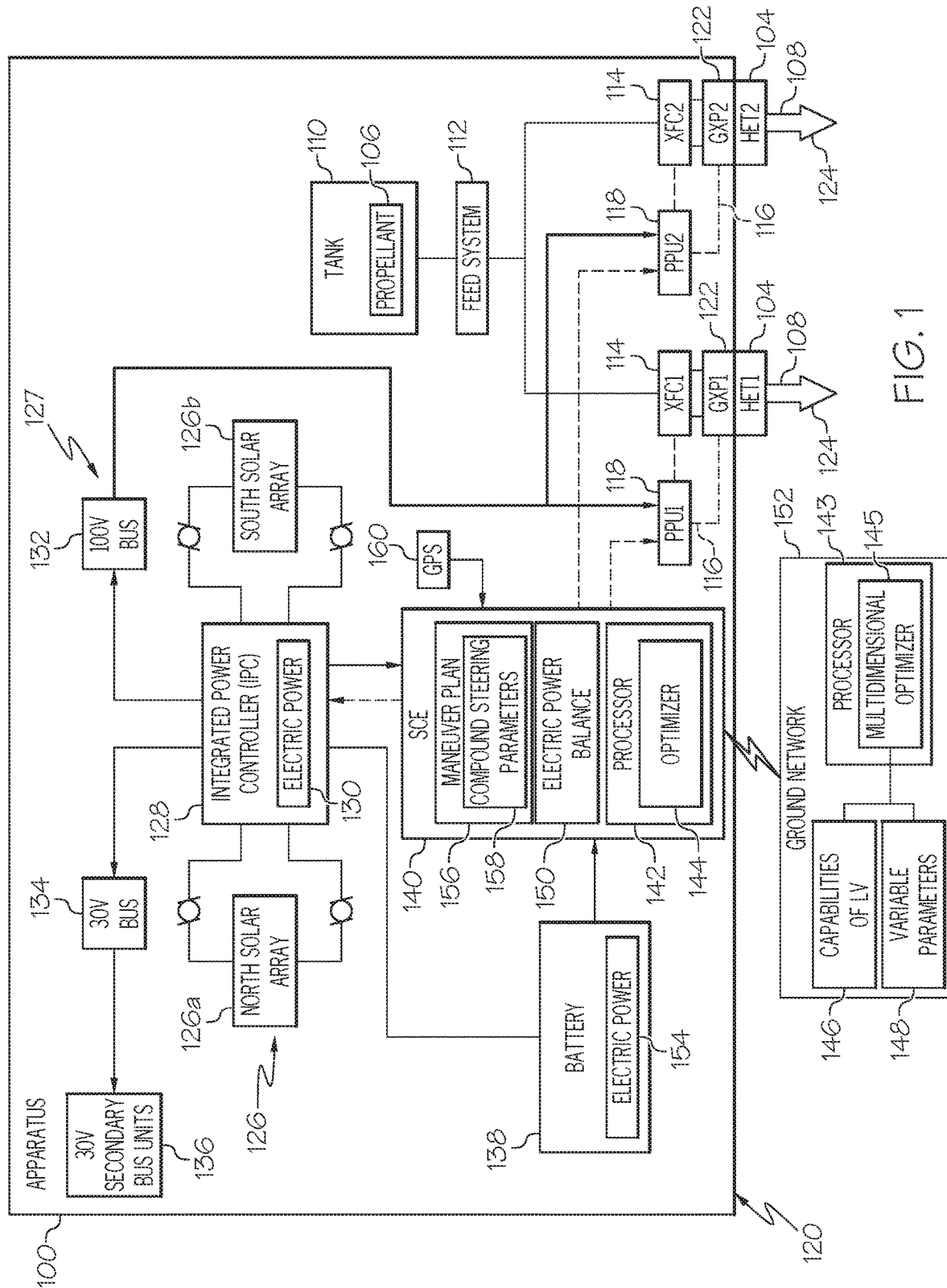
FIG. 1 is a block schematic diagram of an example of an apparatus in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 4:
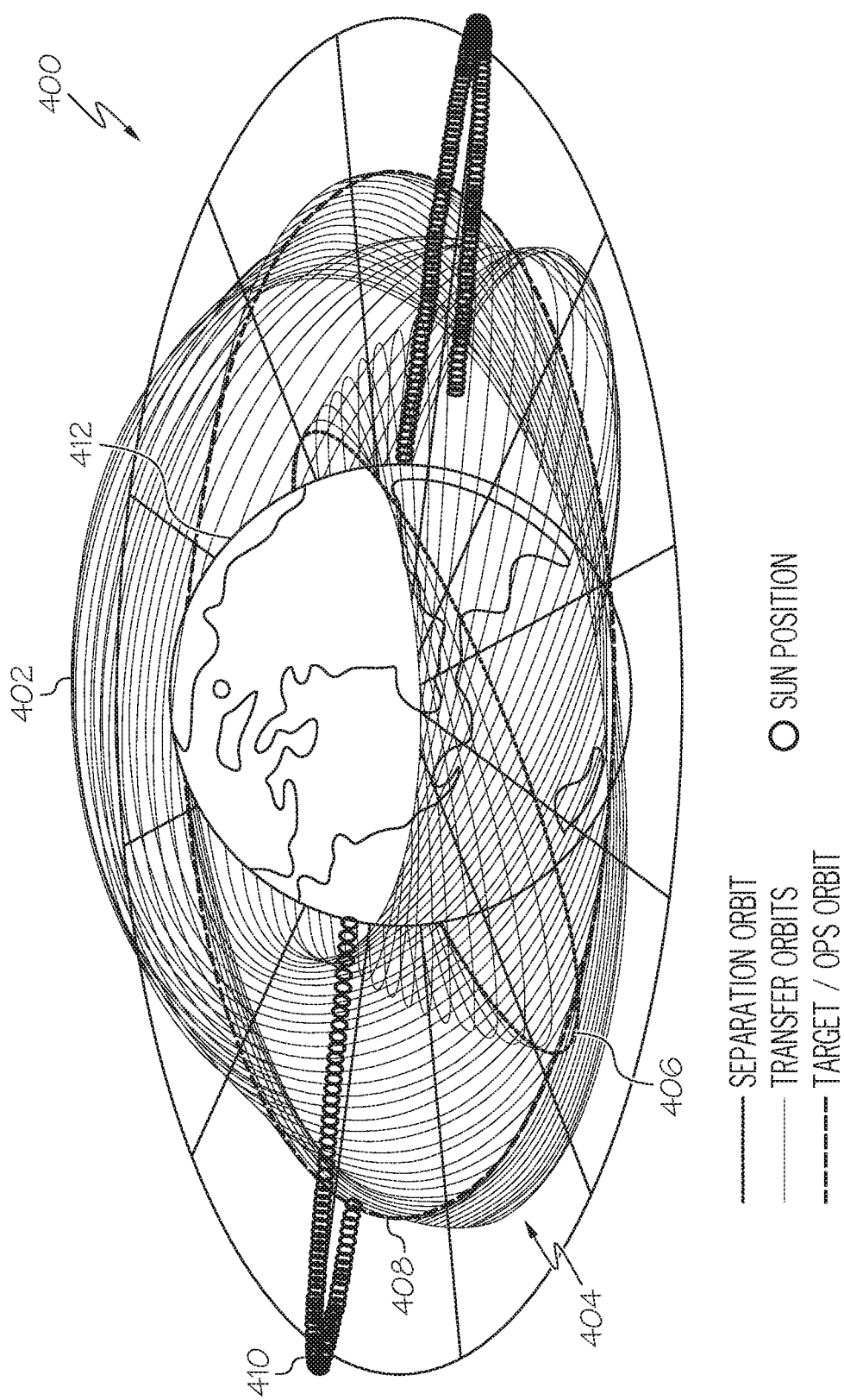
FIG. 4 is an illustration of an example of electric orbit raising of an apparatus including a transfer orbit profile that minimizes the electric orbit raising duration in accordance with an embodiment of the present disclosure.

FIG. 1 is a block schematic diagram of an example of an apparatus 100 in accordance with an embodiment of the present disclosure. In an example, the apparatus 100 is a spacecraft, such as a satellite or other space vehicle. The apparatus 100 is configured to provide optimized power balanced variable thrust transfer orbits 402 (FIG. 4) to minimize an electric orbit raising 400 duration of the apparatus 100. Referring also to FIG. 4, FIG. 4 is an illustration of an example of electric orbit raising 400 of the apparatus 100 including a transfer orbit profile 404 that minimizes the electric orbit raising 400 duration in accordance with an embodiment of the present disclosure. The transfer orbit profile 404 includes a series of transfer orbits 402. Electric orbit raising 400 is a procedure of transitioning the apparatus 100 from a separation orbit 406 after separation from a launch vehicle 502 (FIG. 5) to a target orbit 408 where the apparatus 100 will operate. Electric orbit raising 400 includes the series of transfer orbits 402 during which variable thrusters 104 are fired to move the apparatus 100 to the target orbit 408. A position 410 of the sun 504 (FIG. 5A) relative to the earth 412 during electric orbit raising 400 is also illustrated in the example of FIG. 4.

The apparatus 100 includes one or more variable thrusters 104. In the example in FIG. 1, the apparatus 100 includes two variable thrusters 104. In accordance with an example, the variable thrusters 104 are electric propulsion thrusters, such as Hall Effect thrusters (HET) or similar variable thrusters that are configured to generate variable thrust 108. The one or more variable thrusters 104 are used for electric orbit raising 400 and station-keeping after the apparatus 100 reaches the target orbit 408.

The variable thrusters 104 use a propellant 106 to generate the variable thrust 108. The propellant 106 is stored in a tank 110. In accordance with an example, the propellant 106 is Xenon. In other examples, the propellant 106 is one or more species of propellant or combination thereof. The propellant 106 is fed to the variable thrusters 104 by a feed system 112. A propellant flow controller 114, such as a Xenon flow controller (XFC1 and XFC2) for example, is associated with each variable thruster 104 and couples the feed system 112 to each variable thruster 104 to individually control the supply of propellant 106 to each variable thruster 104. The amount of variable thrust 108 generated by each variable thruster 104 during firing is controlled by an amount of electric power 116 supplied to each variable thruster 104. The amount of propellant 106 used during the firing of each variable thruster 104 is determined by the amount of electric power 116 supplied. The amount of electric power 116 and propellant 106 used will also be dependent upon the duration of firing of the variable thruster 104 each time the variable thruster 104 is fired. A power processing unit (e.g., PPU1 and PPU2) 118 is also associated with each variable thruster 104 to control the amount of electric power 116 supplied to each variable thruster 104 during firing.

Each variable thruster 104 is mechanically coupled to an exterior 120 of the apparatus 100 by a gimbaled platform mechanism 122, such as a Xenon gimbaled platform mechanism (GXP1 and GXP2) for example. The gimbaled platform mechanism 122 provides variable thruster 104 pointing to direct the thrust direction 124.

The apparatus 100 also includes one or more solar arrays 126 (e.g. 126a and 126b) attached to the apparatus 100 to provide electric power 130 to the apparatus 100. The solar arrays 126 are configured to convert light energy to electric energy and provide electric power 130 to the components 127 of the apparatus 100. In the example in FIG. 1, the apparatus 100 includes a north solar array 126a and a south solar array 126b. The north solar array 126a and the south solar array 126b are mounted on opposite sides of the apparatus 100. The north solar array 126a and the south solar array 126b are electrically coupled to an integrated power controller (IPC) 128. The IPC 128 receives electric power 130 from the solar arrays 126 and controls distribution of the electric power 130 to components 127 of the apparatus 100. In the example illustrated in FIG. 1, the IPC 128 provides the electric power 130 to the power processing units 118 to operate the variable thrusters 104 via a first bus 132 which is a 100 volt bus in the example of FIG. 1. The IPC 128 also distributes electric power 130 to other components 127 of the apparatus 100 via a second bus 134 which is a 30 volt bus in the example of FIG. 1. Other embodiments may include buses of different voltages. The second bus 134 is connected to secondary bus units 136.

The apparatus 100 also includes a battery 138 to power the apparatus 100. In one embodiment, the battery 138 is a battery pack. The battery 138 is charged by electric power 130 from the solar arrays 126 through the IPC 128. The IPC 128 controls charging of the battery 138 by the solar arrays 126.

The apparatus 100 further includes control electronics 140. The control electronics are powered by either the battery 138 or the IPC 128. In the example of FIG. 1, the control electronics 140 are spacecraft control electronics (SCE) if the apparatus 100 is a spacecraft or the like. The control electronics 140 include a processor 142. In an embodiment where the apparatus 100 is an autonomous apparatus as described in more detail with reference to FIG. 2C, the control electronics 140 are configured to perform functions, such as providing optimized power balanced variable thrust transfer orbits 402 (FIG. 4) to minimize an electric orbit raising 400 duration of the apparatus 100. The processor 142 includes an optimizer 144 to provide an optimized series of transfer orbits 402 (FIG. 4) as described in more detail with reference to FIGS. 2A and 2C. Examples of operation of the optimizer 144 will be described in more detail with reference to block 210 in FIG. 2A and blocks 306 and 308 in FIG. 3. In an embodiment were the apparatus 100 is an autonomous apparatus, the control electronics 140 are configured to perform the functions of block 210 in FIG. 2A and blocks 306 and 308 in FIG. 3.

Figure 2A:
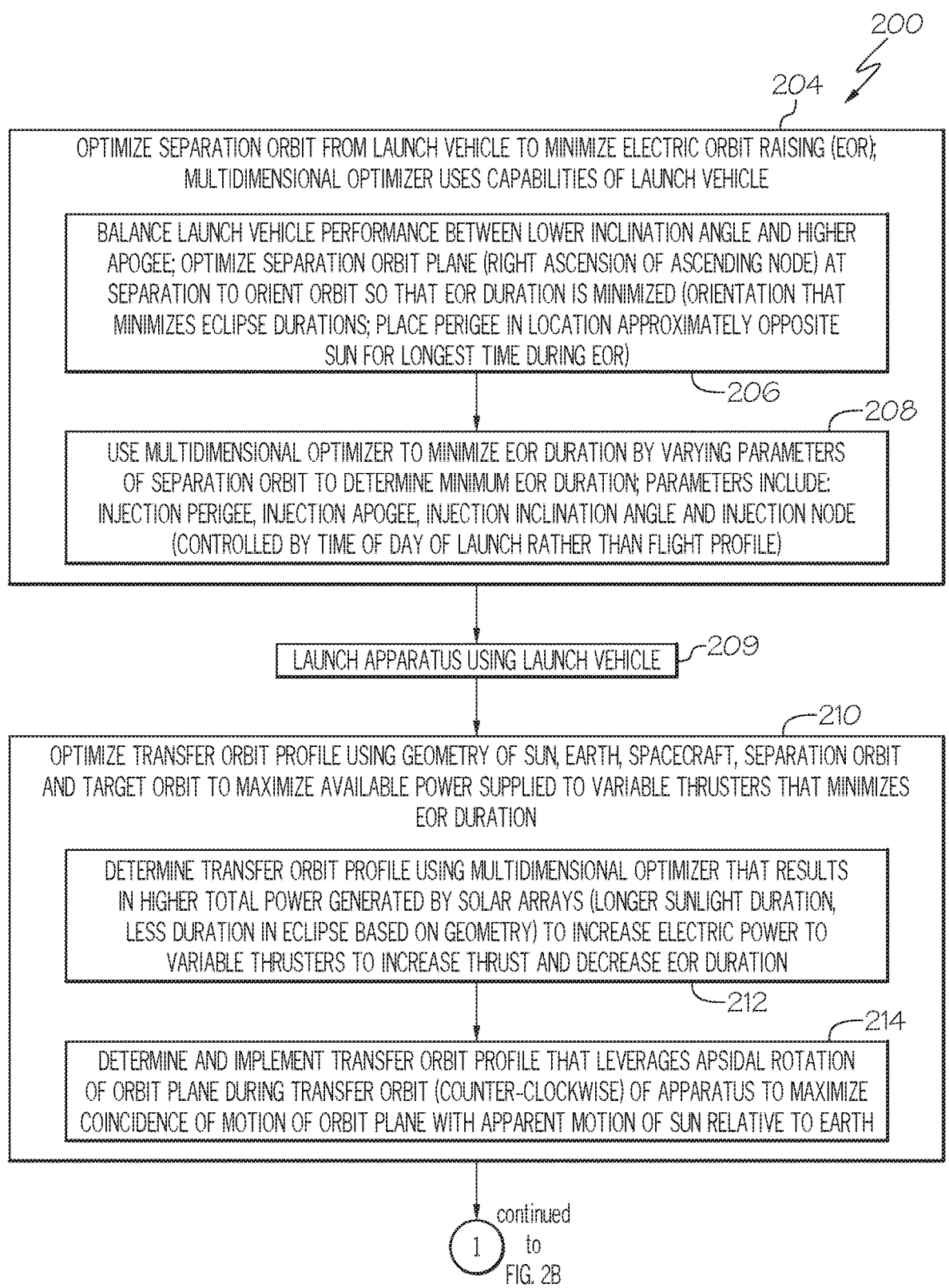
FIGS. 2A and 2B are a flow chart of an example of a method for providing optimized power balanced variable thrust transfer orbits to minimize an electric orbit raising duration of an apparatus in accordance with an embodiment of the present disclosure.
Figure 2B:
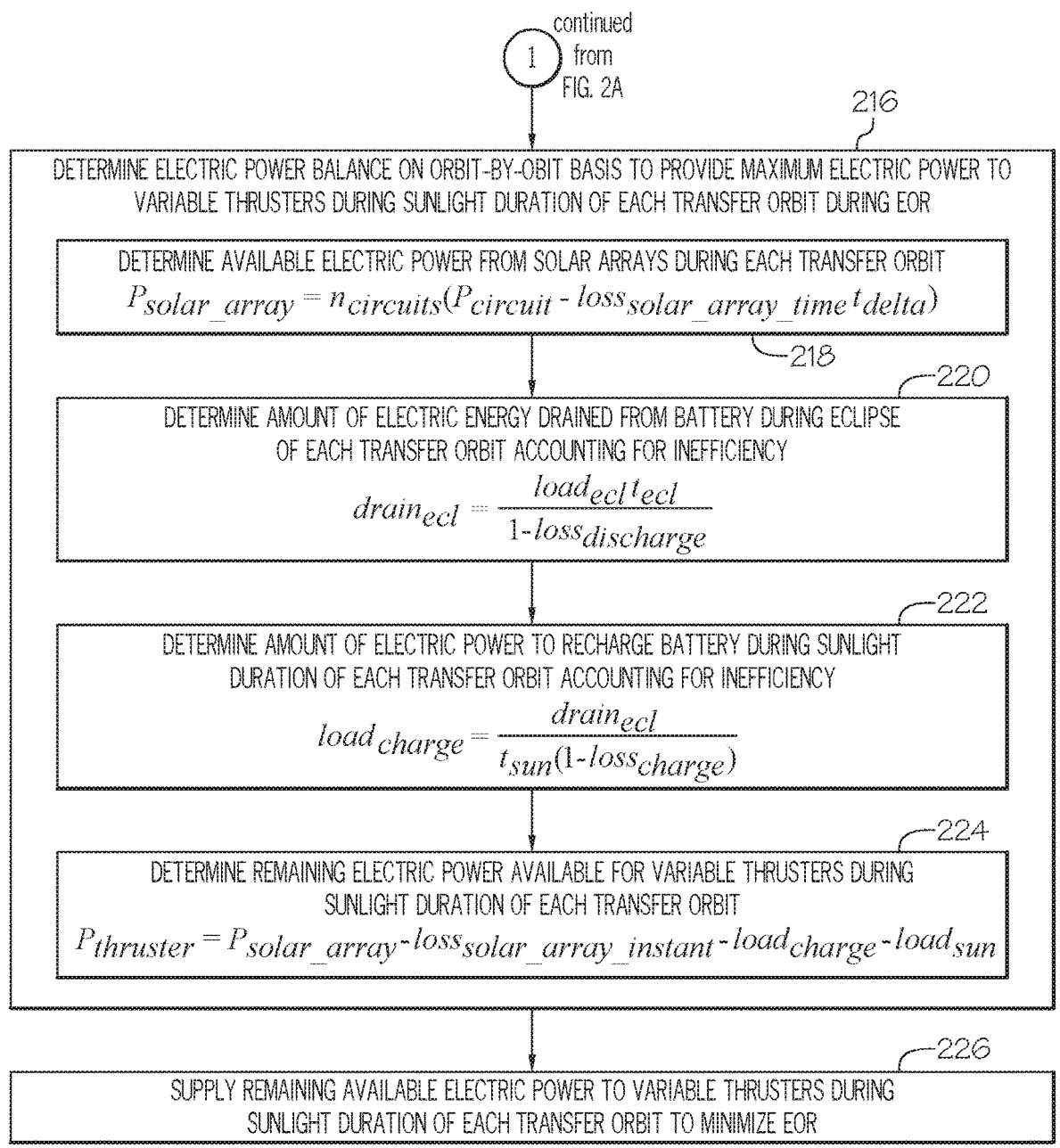
Figure 2C:
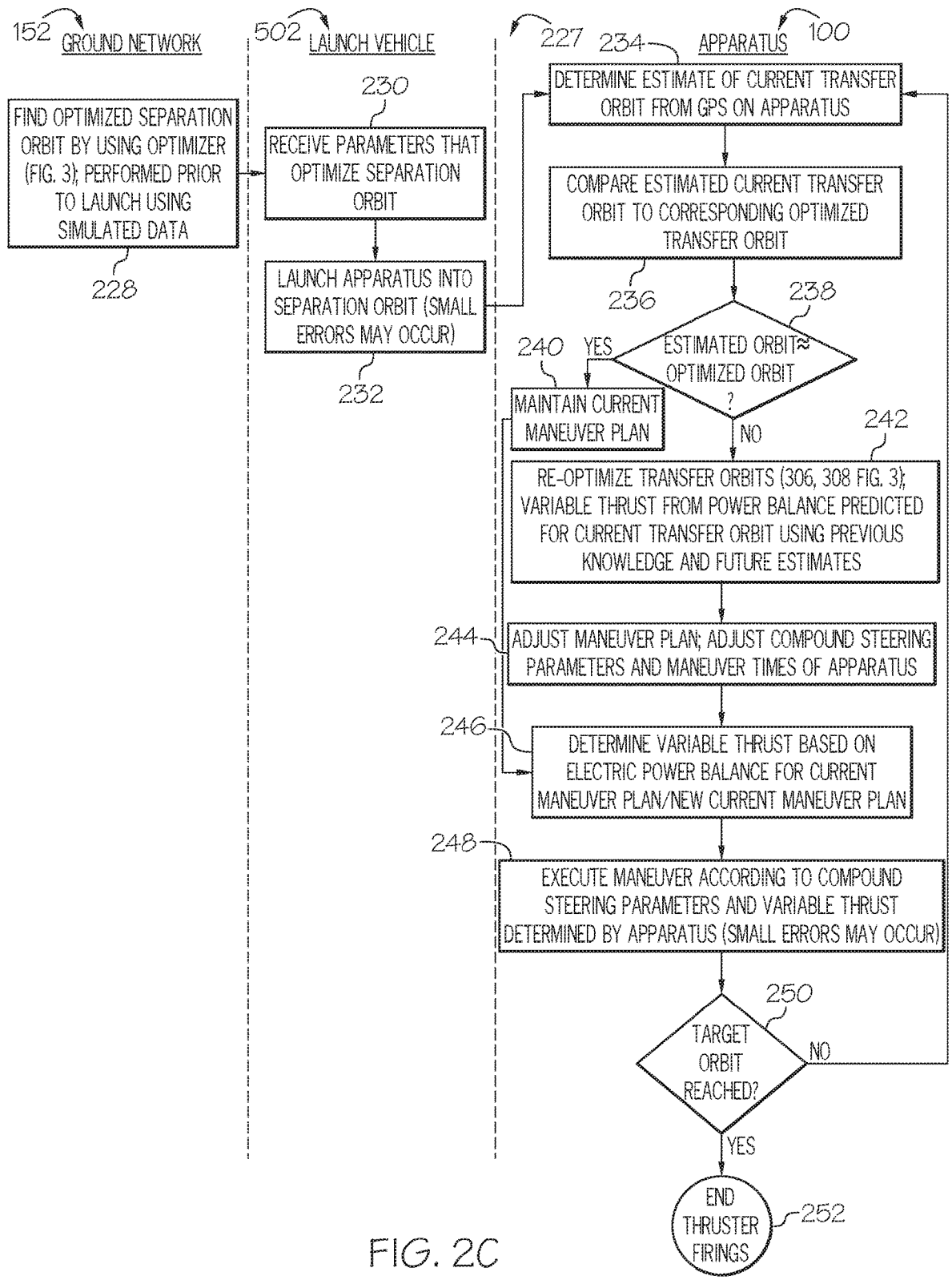
FIG. 2C is a flow chart of an example of a method for providing optimized power balanced variable thrust transfer orbits to minimize an electric orbit raising duration of an apparatus where the apparatus is an autonomous apparatus in accordance with another embodiment of the present disclosure.
Figure 2D:
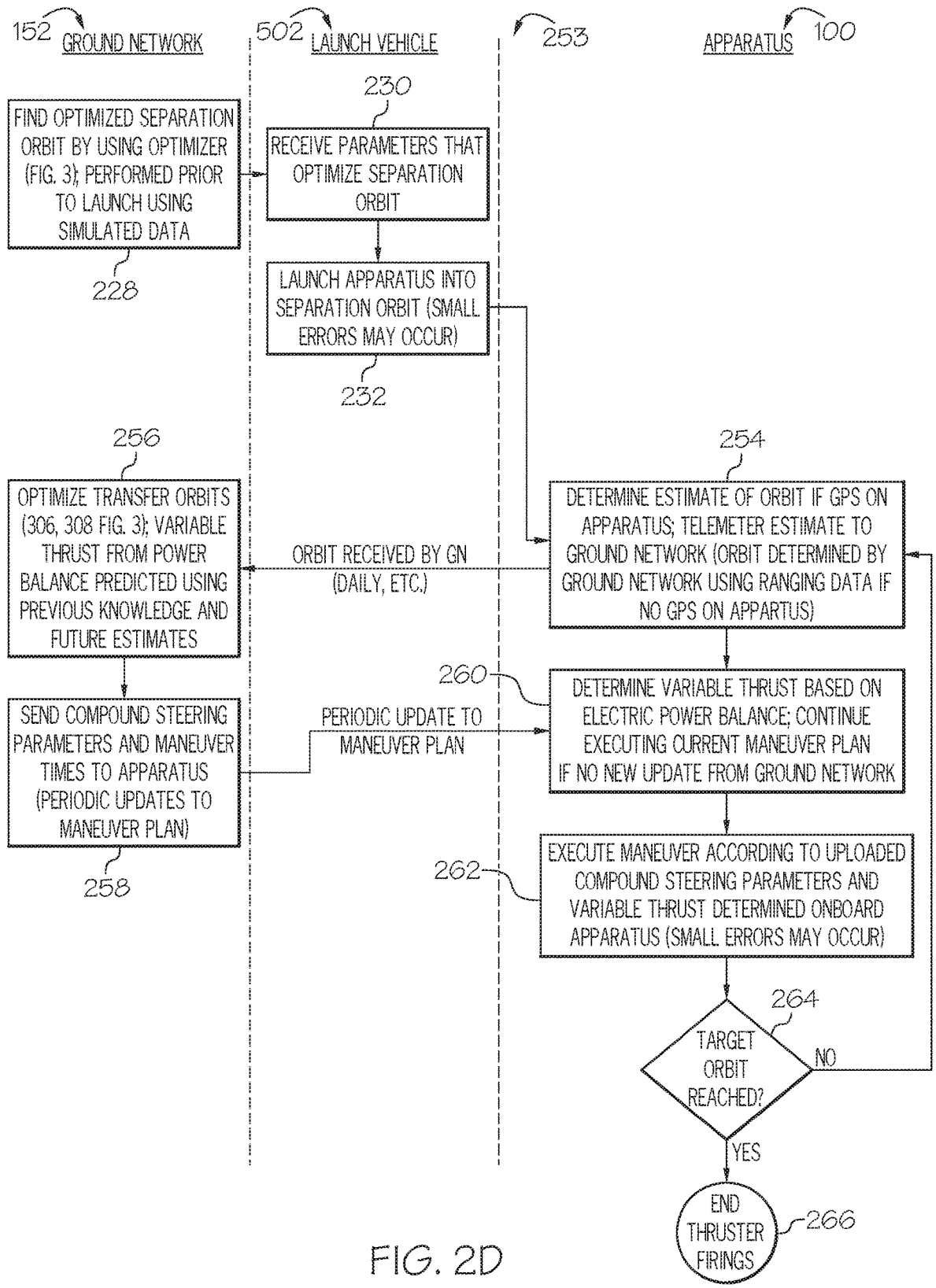
FIG. 2D is a flow chart of an example of a method for providing optimized power balanced variable thrust transfer orbits to minimize an electric orbit raising duration of an apparatus wherein the apparatus is a non-autonomous or partially autonomous apparatus in accordance with a further embodiment of the present disclosure.
Figure 3:
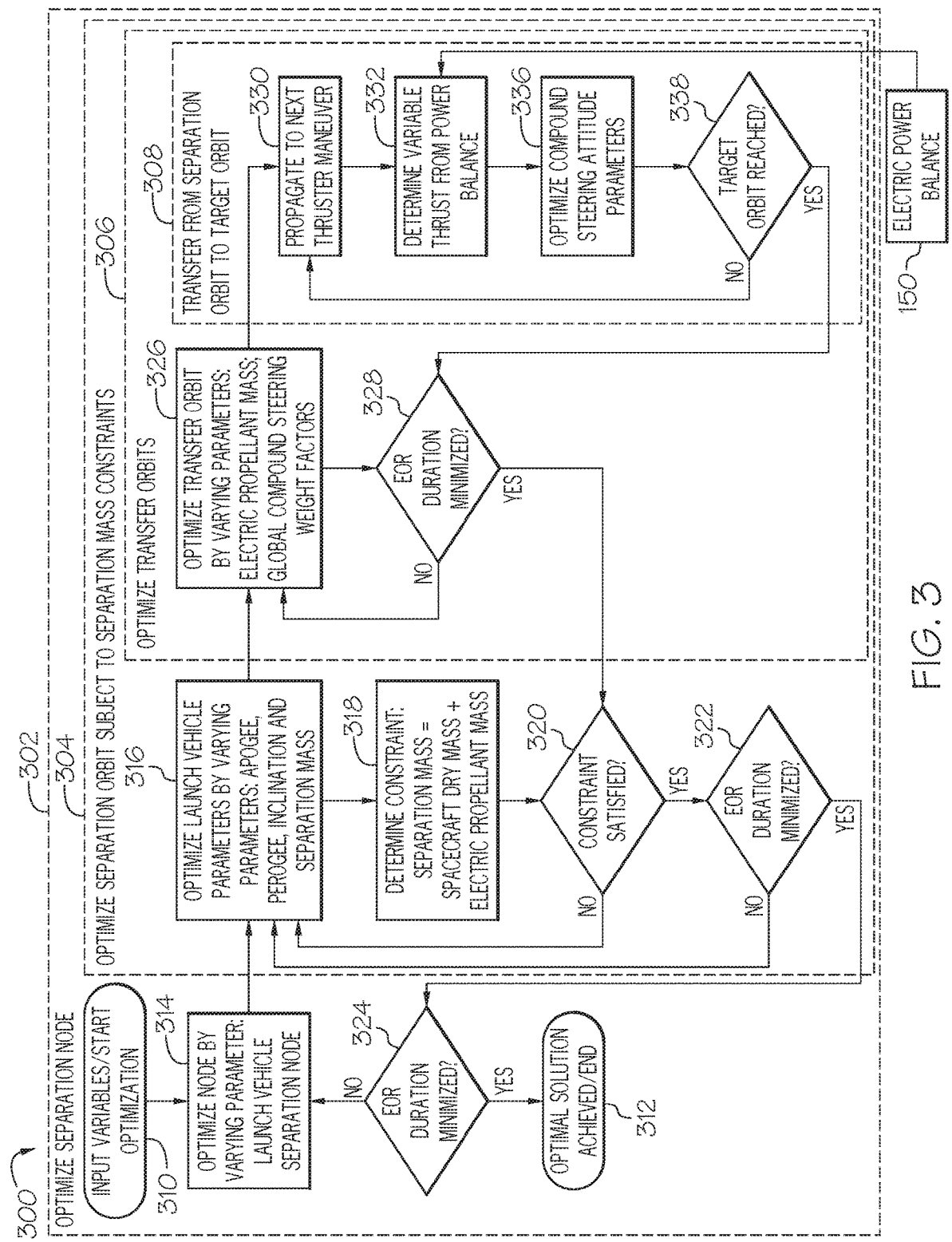
FIG. 3 is a flow chart of an example of a method for operation of a multidimensional optimizer to minimize an electric orbit raising duration of an apparatus in accordance with an embodiment of the present disclosure.
Figure 5A:
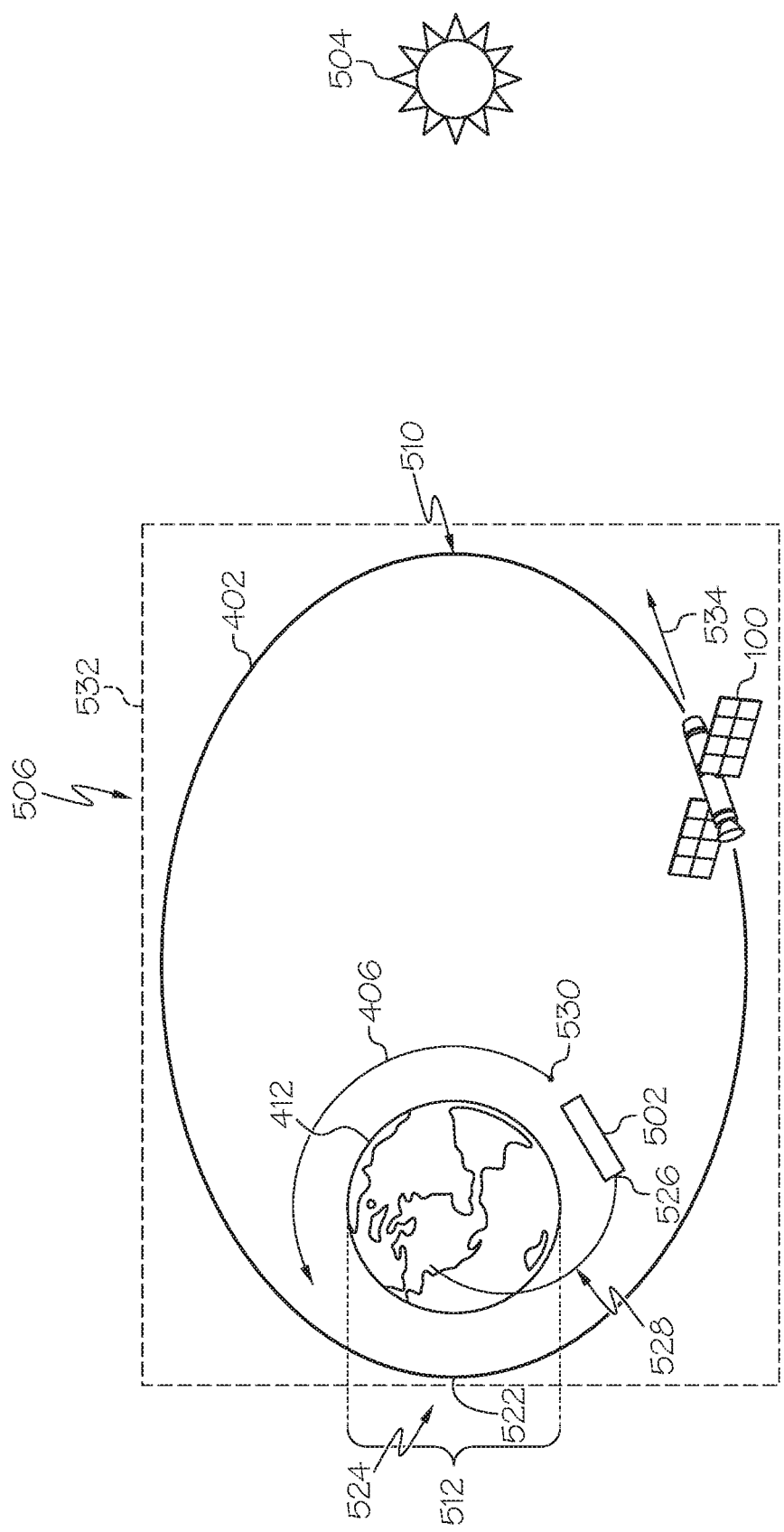
FIGS. 5A and 5B are an illustration of an example of optimizing a separation orbit of the apparatus from a launch vehicle that minimizes the electric orbit raising in accordance with an embodiment of the present disclosure.

In accordance with an embodiment, a ground network 152 includes another processor 143 configured to perform at least some of the functions described with respect to method 200 in FIGS. 2A-2D and method 300 in FIG. 3. A multidimensional optimizer 145 is embodied in and runs on the processor 143. The multidimensional optimizer 145 is configured to perform at least a first level 302 of optimization and a second level 304 of optimization of the method 300 in FIG. 3 using simulated launch data prior to launching the apparatus 100 by a launch vehicle 502 (FIG. 5A). As described in more detail with reference to blocks 204-208 in FIG. 2A and blocks 302 and 304 in FIG. 3, the first level (block 302) of optimization determines an optimized separation node 530 which is the location where the apparatus 100 separates from launch vehicle 502. The second level (block 304) of optimization determines an optimized separation orbit 406 which is the first transfer orbit 402 of the apparatus 100 after separation from the launch vehicle 502 and start of electric orbit raising 400. In accordance with another embodiment, the ground network 152 includes a control station and the control station includes a processor similar to processor 143.

The processor 143 is also configured to use capabilities 146 of the launch vehicle (LV) 502 (FIG. 5A) and to vary variable parameters 148 of the separation orbit 406 (FIGS. 4 and 5A), depending upon the capabilities 146 of a particular launch vehicle 502 used, to optimize the separation orbit 406 and minimize the electric orbit raising 400 duration. Launch vehicle capabilities 146 include performance capabilities, such as thrust performance, payload capacity, etc., of a particular launch vehicle 502. The capabilities 146 may vary based on a particular mission of the launch vehicle 502. Examples of variable parameters 148 of the separation orbit 406 will be described with reference to blocks 314 and 316 in FIG. 3.

In accordance with an embodiment where the apparatus 100 is a non-autonomous apparatus or partially autonomous apparatus, the multidimensional optimizer 145 of the ground network 152 is configured to determine a series of optimized transfer orbits 402 (FIG. 4) as described in more detail with reference to blocks 256 and 258 in FIG. 2D and blocks 306 and 308 in FIG. 3.

In accordance with an embodiment, the control electronics 140 are configured to determine an electric power balance 150 on an orbit-by-orbit basis for each transfer orbit 402 to provide maximum electric power 116 to the variable thrusters 104 during a sunlight duration 510 (FIG. 5A) of each transfer orbit 402 to minimize the electric orbit raising 400 duration. The sunlight duration 510 of each transfer orbit 402 occurs when the apparatus 100 is not in an eclipse 512. An eclipse 512 occurs when the earth 412 is between the apparatus 100 and the sun 504 each transfer orbit 402. However, under some circumstances, for example, if only a single variable thruster 104 is available, firing the available variable thruster 104 during an eclipse 512 may become desirable. The electric power balance 150 is a balance between an amount of electric power 116 supplied to each of the variable thrusters 104 and an amount of electric power 130 supplied by the solar arrays 126 though the IPC 128 to recharge the battery 138 and to provide electric power 130 to other components 127 of the apparatus 100. As previously described, each variable thrusters 104 generates an amount of variable thrust 108 proportional to the amount of electric power 116 supplied to each variable thruster 104 when the variable thruster 104 is fired.

In accordance with an embodiment, the control electronics 140 are configured to transfer the apparatus 100 to a second transfer orbit 402 to reach the target orbit 408 and determine a variable thrust 108 based on a current electric power balance 150. The control electronics 140 are also configured to execute a thruster 104 maneuver to transfer the apparatus 100 from the first transfer orbit 402 to the second transfer orbit 402 according to the determined variable thrust 108 and a predetermined maneuver plan 156. The predetermined maneuver plan 156 includes a set of compound steering parameters 158. The set of compound steering parameters 158 are based on an optimized variable thrust 108 and an associated electrical power balance 150 to the optimized variable thrust 108. The predetermined maneuver plan 156 also includes an optimized series of transfer orbits 402 to minimize the electric orbit raising 400 duration of the apparatus 100 to the target orbit 408. The second transfer orbit 402 is one of the optimized series of transfer orbits 402. The set of compound steering parameters 158 are optimized to minimize the electric orbit raising 400 duration of the apparatus 100 to the target orbit 408. Examples of compound steering for efficient low thrust transfer orbits are described in U.S. Pat. No. 8,457,810, entitled "Compound Steering Law for Efficient Low Thrust Transfer Orbit Trajectory, issued Jun. 4, 2013, assigned to the same assignee as the present application and incorporated herein by reference. Examples of compound steering are also described in U.S. Pat. No. 8,930,048, entitled "Enhanced Compound Steering Law for General Low Thrust Mission," issued Jun. 6, 2015, assigned to the same assignee as the present application and incorporated herein by reference.

In accordance with an embodiment, the control electronics 140 are further configured to receive the predetermined maneuver plan 156 from another apparatus. Examples of the other apparatus include but are not necessarily limited to at least one of a control station, a ground control station, a spacecraft, and a repeater station. In accordance with another embodiment, the control electronics 140 are configured to determine the predetermined maneuver plan 156. In one example, the ground network 152 determines the maneuver plan 156, transmits to one or more intermediary apparatuses, which in turn relays the maneuver plan 156 to the apparatus 100 in question. Examples of intermediary apparatuses include but are not limited to, spacecraft, a control station, satellite or any other apparatus that can communicate with apparatus 100. In another example, another spacecraft or apparatus that is communicatively connected (directly or indirectly) to apparatus 100 and that is equipped with the multidimensional optimizer 145 receives the location of apparatus 100 and determines the maneuver plan 156 and transmits the maneuver plan 156 to apparatus 100.

In accordance with an embodiment and as described in more detail with reference to FIG. 2C, the control electronics 140 are configured to re-optimize the optimized series of transfer orbits 402 in response to an estimated current transfer orbit 402 not being approximately equal to a corresponding optimized transfer orbit of the optimized series of transfer orbits 402 to minimize the electric orbit 400 duration. The control electronics 140 are also configured to adjust the predetermined maneuver plan 156 according to the re-optimized series of transfer orbits 402. The control electronics are also configured to execute a thruster 104 maneuver according to a set of adjusted compound steering parameters 158 and an adjusted variable thrust 108 of the adjusted predetermined maneuver plan 156.

FIGS. 2A and 2B are a flow chart of an example of a method 200 for providing optimized electric power balanced variable thrust transfer orbits 402 (FIG. 4) to minimize an electric orbit raising 400 duration of an apparatus 100 in accordance with an embodiment of the present disclosure. In accordance with an example, the blocks 204-208 of the method 200 are embodied in and performed by the ground network 152.

In block 204, a separation orbit 406 (FIG. 4 and FIG. 5A) from the launch vehicle 502 (FIG. 5A) is optimized to minimize the electric orbit raising 400 duration using the multidimensional optimizer 145. Using the multidimensional optimizer 145 includes using capabilities 146 of the launch vehicle 502 and varying variable parameters 148 of the separation orbit 406 depending upon the capabilities 146 of a particular launch vehicle 502 used. An example of a method 300 of operation of the multidimensional optimizer 145 will be described with reference to FIG. 3.

Figure 5B:
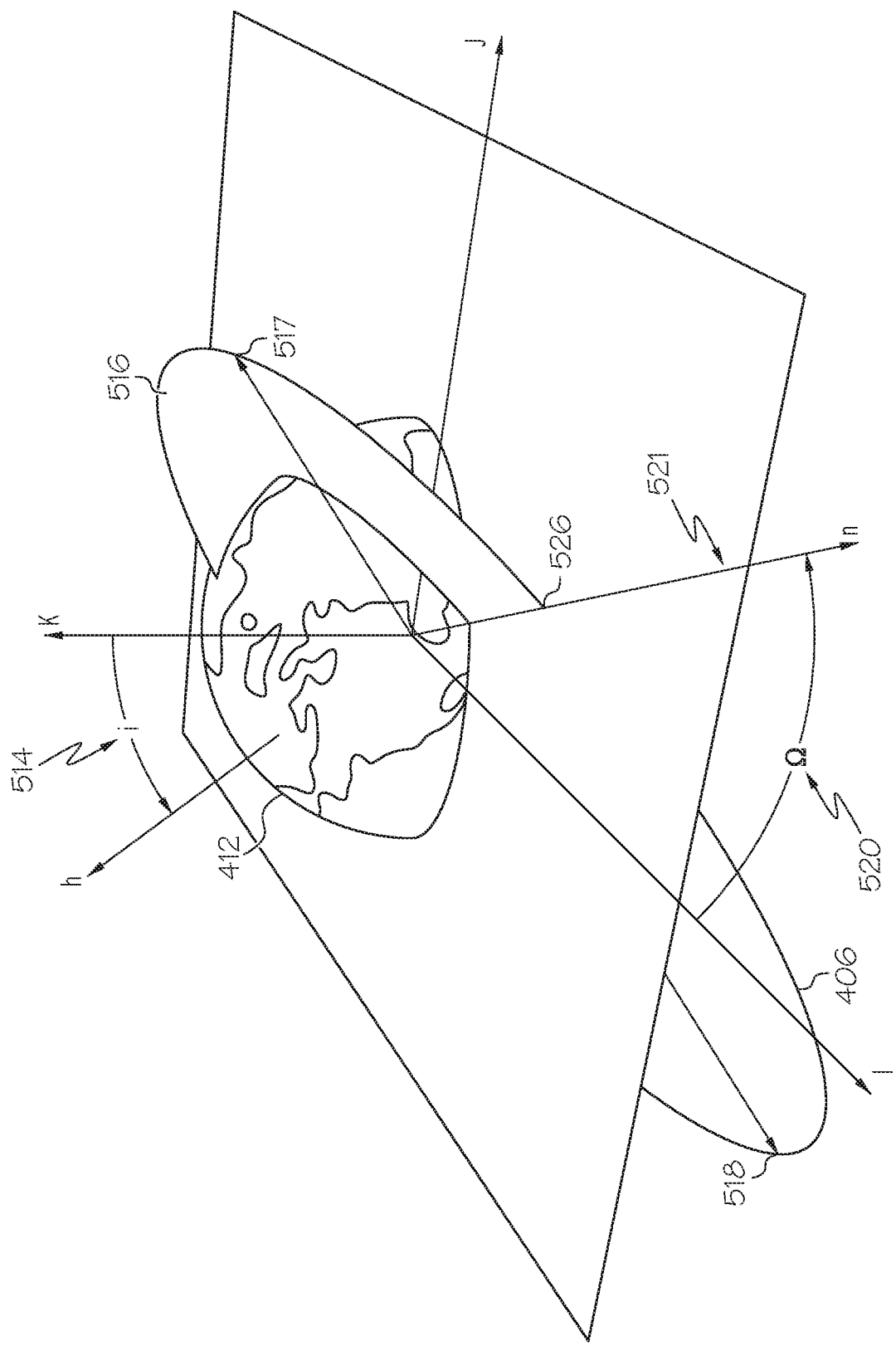

Referring also to FIGS. 5A and 5B, FIGS. 5A and 5B are an illustration of an example of optimizing a separation orbit 406 of the apparatus 100 from a launch vehicle 502 that minimizes the electric orbit raising 400 duration in accordance with an embodiment of the present disclosure. The electric orbit raising 400 duration may also be referred to as transfer orbit 402 duration. In block 206, optimizing the separation orbit 406 from the launch vehicle 502 includes balancing launch vehicle 502 performance between a lower injection inclination angle 514 (FIG. 5B) of a separation orbit plane 516 defined by the separation orbit 406 of the apparatus 100 at separation from the launch vehicle 502 and a higher injection apogee 518 of the separation orbit 406. In the example in FIG. 5B, an orthogonal coordinate system is defined with orthogonal axes I, J and K. The injection inclination angle 514 of the separation orbit 406 is defined by the angle between a normal h to the separation orbit plane 516 and the axis K. The separation orbit plane 516 at separation of the apparatus 100 from the launch vehicle 502 is defined by right ascension of an ascending node 520 which is an angle omega, $\Omega$, between axis I and a line of nodes (n) 521 in a plane defined by axes I and J. In block 206, optimization of the separation orbit 406 of the apparatus 100 from the launch vehicle 502 is achieved by controlling the launch vehicle 502 performance to orient the separation orbit plane 516 of the apparatus 100 to minimize eclipse 512 durations during electric orbit raising 400. The separation orbit 406 is also optimized to place a perigee 522 of the transfer orbits 402 during electric orbit raising 400 in a location 524 approximately opposite the sun 504 for a longest accumulated time during electric orbit raising 400. This also minimizes the eclipse 512 durations during electric orbit raising 400 to minimize the electric orbit raising 400 duration.

In block 208, the multidimensional optimizer 145 is used to minimize the electric orbit raising 400 (FIG. 4) by varying the variable parameters 148 of the separation orbit 406. Referring also to FIG. 5B, varying the variable parameters 148 of the separation orbit 406 includes varying an injection perigee 517, an injection apogee 518, an injection inclination angle 514 and an injection node 526 by controlling performance of the launch vehicle 502. In one example, the injection node 526 is controlled by the time of day of the launch of the launch vehicle 502 rather than a flight profile 528 (FIG. 5A) of the launch vehicle 502. In another example, the injection node 526, is controlled by powered flight of the launch vehicle 502. The injection node 526 is the node of the orbit achieved by the last thruster burn of the launch vehicle 502. In accordance with an example, the launch vehicle 502 may carry a plurality of apparatuses, such as apparatus 100 in FIG. 1. Each apparatus 100 has a separation node 530 (FIG. 5A) which is the location where a particular apparatus separates from the plurality of apparatuses.

In block 209, the apparatus 100 is launched using a launch vehicle 502 (FIG. 5A). As previously described in the example of FIG. 1, the apparatus 100 includes one or more variable thrusters 104, and a battery 138 to provide electric power 154 to components 127 of the apparatus 100. The apparatus 100 also includes one or more solar arrays 126 (e.g. 126a and 126b) to recharge the battery 138, provide electric power 130 to other components 127 of the apparatus 100, and to provide electric power 116 to the variable thrusters 104.

In block 210, a transfer orbit profile 404 (FIG. 4) is optimized using a geometry 506 (FIG. 5A) of the apparatus 100, sun 504, earth 412, the separation orbit 406, and a target orbit 408 to maximize available electric power 116 (FIG. 1) to the variable thrusters 104 to minimize the electric orbit raising 400 duration. Examples of optimizing the transfer orbit profile 404 using the geometry 506 are described in more detail with reference to blocks 212 and 214. As previously described, in accordance with an embodiment where the apparatus 100 is autonomous, the apparatus is configured to optimize the transfer orbits 402 as described in more detail with reference to FIG. 2C. In accordance with an embodiment where the apparatus 100 in non-autonomous or partially autonomous, the ground network 152 is configured to optimize the transfer orbits 402 as described in more detail with reference to FIG. 2D.

In block 212, the transfer orbit profile 404 is optimized to provide a longer accumulated sunlight duration 510 and less accumulated duration in eclipses 512 based on the geometry 506 during electric orbit raising 400. This provides a higher total electric power 130 generated by the solar arrays 126 to increase the electric power 116 supplied to the variable thrusters 104 to increase variable thrust 108 each transfer orbit 402 and thus decrease the electric orbit raising 400 duration.

Figure 6:
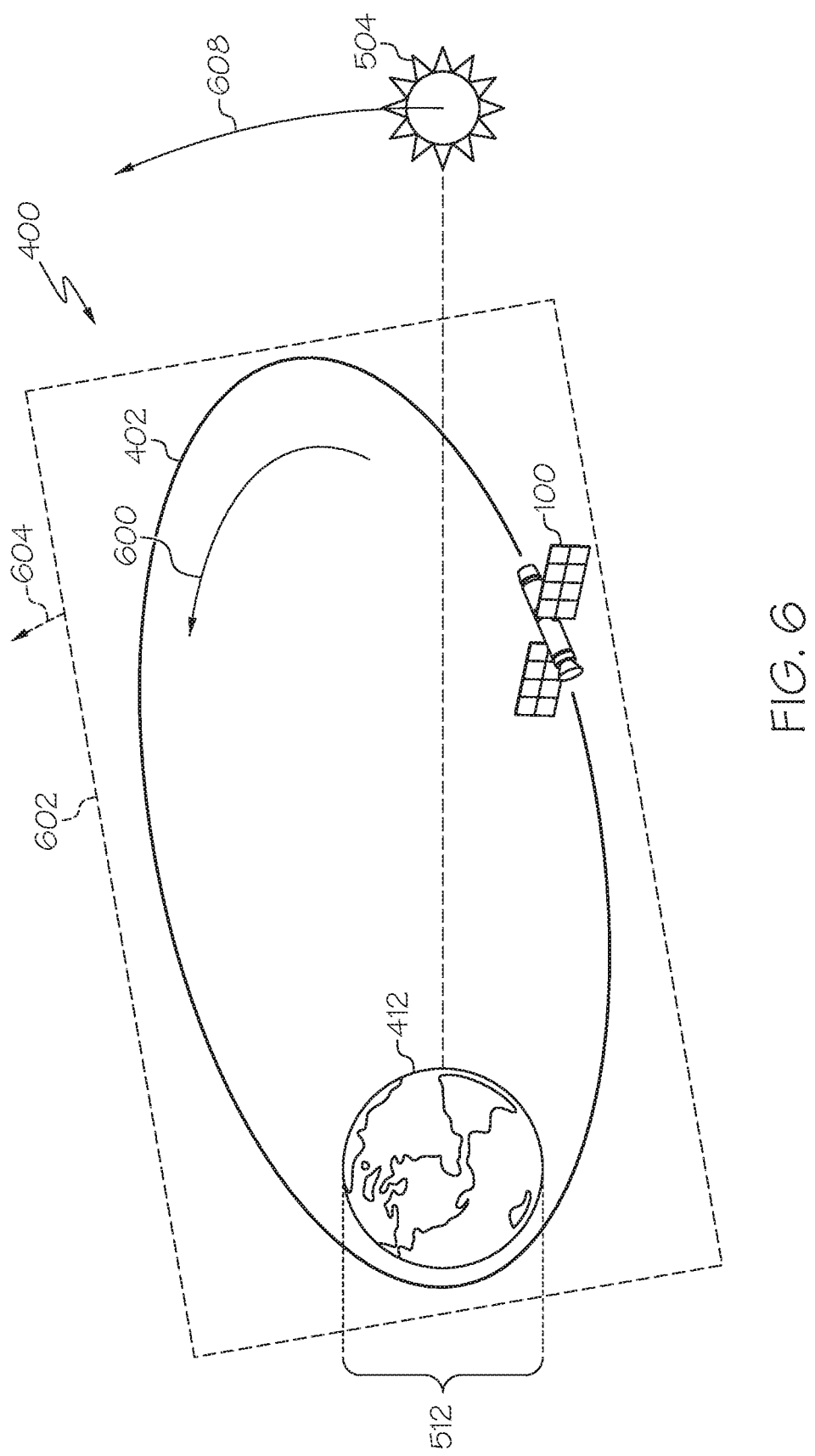
FIG. 6 is an illustration of an example of apsidal rotation of an orbit plane of a transfer orbit of the apparatus during electric orbit raising in accordance with an embodiment of the present disclosure.

Referring also to FIG. 6, FIG. 6 is an illustration of an example of apsidal rotation 600 of an orbit plane 602 of a transfer orbit 402 of the apparatus 100 during electric orbit raising 400 in accordance with an embodiment of the present disclosure. In block 214, an optimized transfer orbit profile 404 (FIG. 4) is implemented that leverages the apsidal rotation 600 of an orbit plane 602 during the transfer orbit 402 of the apparatus 100 to maximize a coincidence of motion 604 of the orbit plane 602 of the apparatus 100 with an apparent motion 608 of the sun 504 relative to the earth 412. This also maximizes the amount of time the apparatus 100 is in sunlight during the electric orbit raising 400 to increase the electric power 116 supplied to the variable thrusters 104 and thus decrease the electric orbit raising 400 duration.

In block 216, an electric power balance 150 (FIG. 1) is determined on an orbit-by-orbit basis for each transfer orbit 402 to provide maximum electric power 116 to the variable thrusters 104 during a sunlight duration 510 (FIG. 5A) of each transfer orbit 402 to minimize the electric orbit raising 400 duration. The electric power balance 150 is a balance between electric power 116 supplied to each variable thrusters 104 and electric power 130 supplied by the solar arrays 126 via the IPC 128 to recharge the battery 138 and to provide electric power 130 to other components 127 of the apparatus 100. Each variable thruster 104 provides a variable amount of thrust 108 proportional to an amount of electric power 116 supplied to the variable thruster 104 by the associated power processing unit 118.

An example of determining the electric power balance 150 on an orbit-by-orbit basis for each transfer orbit 402 to provide maximum electric power 116 to each variable thrusters 104 is described in more detail with reference to blocks 218-224. In accordance with an embodiment, the maximum electric power 116 is provided to each variable thruster 104 during a sunlight duration 510 of each transfer orbit 402 to minimize the electric orbit raising 400 duration. However, under some circumstances, for example, if only a single variable thruster 104 is available, firing the available variable thruster 104 during an eclipse 512 may become desirable.

In block 218, an available electric power 130 (FIG. 1) from the solar arrays 126 is determined for each transfer orbit 402 using equation 1:

$$P_{solar\_array} = n_{circuit}(P_{circuit} - loss_{solar\_array\_time} t_{delta})$$ Equation 1

Where $P_{solar\_array}$ is the available electric power 130 from at least one of the solar arrays 126a or 126b. The baseline is to use both solar arrays 126a and 126b. $n_{circuit}$ is the number of photocell circuits in the solar arrays 126a and 126b, $P_{circuit}$ is the power per solar array circuit and $loss_{solar\_array\_time} t_{delta}$ is the power loss in the solar arrays 126a and 126b over a time period $t_{delta}$.

In block 220, an amount of electric energy drained from the battery 138 during an eclipse 512 of each transfer orbit 402 is determined from equation 2:

$$drain_{ecl} = \frac{load_{ecl}\ t_{ecl}}{1 - loss_{discharge}}$$ Equation 2

Where $drain_{ecl}$ is the amount of electric energy drained from the battery 138 during each eclipse 512. $load_{ecl}$ is the load connected to the battery during the eclipse 512 and $t_{ecl}$ is the duration of the eclipse 512. $1-loss_{discharge}$ considers inefficiency of discharging the battery 138 by subtracting loss during discharge ($loss_{discharge}$) of the battery 138 from one when the battery 138 is supplying electric power 154 to other components 127 of the apparatus 100.

In block 222, an amount of electric power 154 to recharge the battery 138 during the sunlight duration 510 of each transfer orbit 402 is determined using equation 3:

$$load_{charge} = \frac{drain_{ecl}}{t_{sun}\ (1 - loss_{charge})}$$ Equation 3

Where $load_{charge}$ is the amount of electric charge to recharge the battery 138 during the sunlight duration 510 of each transfer orbit 402. $t_{sun}$ is the sunlight duration 510 of each transfer orbit 402 and $1-loss_{charge}$ takes into account the charging inefficiency of the battery 138 by subtracting charging loss ($loss_{charge}$) from one when the battery 138 is being charged during the sunlight duration 510 of each transfer orbit 402.

In block 224, the remaining electric power 130 available for the variable thrusters 104 during the sunlight duration 510 of each transfer orbit 402 is determined by equation 4:

$$P_{thrust} = P_{solar\_array} - loss_{solar\_array\_instant} - load_{charge} - load_{sun}$$ Equation 4

Where $P_{thrust}$ is the remaining electric power 130 available for the variable thrusters 104 during the sunlight duration 510 of each transfer orbit 402. $loss_{solar\_array\_instant}$ is electric power loss in the solar arrays 126 due to inefficiencies in the solar arrays 126. $load_{sun}$ are other loads drawing electric power 130 from the solar arrays 126 during the sunlight duration 510 of each transfer orbit 402.

In block 226, the remaining available electric power 130 from the solar arrays 126 during sunlight duration 510 of each transfer orbit 402 is supplied to the variable thrusters 104 to minimize the electric orbit raising 400 duration.

FIG. 2C is a flow chart of an example of a method 227 for providing optimized power balanced variable thrust transfer orbits 402 to minimize an electric orbit raising 400 duration of an apparatus 100 where the apparatus 100 is an autonomous apparatus in accordance with another embodiment of the present disclosure. The elements of the exemplary method 227 are separated into those elements that are embodied in and performed by the ground network 152; those elements that are embodied in and performed by the launch vehicle 502; and those elements that are embodied in and performed by the apparatus 100.

In block 228, an optimized separation orbit 406 (FIG. 4) is found by using an optimizer, such as for example, multidimensional optimizer 145 in FIG. 1. An example of finding an optimized separation orbit 406 is described with reference to blocks 204-208 in FIG. 2A and blocks 302 and 304 in FIG. 3. Finding the optimized separation orbit 406 is performed prior to the launch using simulated launch data.

In block 230, parameters that optimize the separation orbit 406 are received by the launch vehicle 502. Examples of the parameters that optimize the separation orbit 406 are described with reference to blocks 314 and 316 in FIG. 3. In block 232, the apparatus 100 is launched by the launch vehicle 502 into the separation orbit 406. The parameters associated with the actual separation orbit 405 may include small errors from the simulated separation orbit 406 found by the ground network 152.

In block 234, an estimate of a current transfer orbit 402 of the apparatus 100 is determined. In accordance with an example, the estimate of the current transfer orbit 402 of the apparatus 100 is determined by a global positioning system (GPS) 160 (FIG. 1) on the apparatus 100.

In block 236, the estimated current transfer orbit 402 is compared to a corresponding optimized transfer orbit 402 of a predetermined optimized transfer orbit profile 404. The predetermined optimized transfer orbit profile 404 includes an optimized series of transfer orbits 402. In accordance with an embodiment, the predetermined optimized transfer orbit profile 404 is determined prior to launch of the apparatus 100. An example of determining the predetermined optimized transfer orbit profile 404 by an optimizer, such as for example, multidimensional optimizer 145, is described with reference to blocks 306 and 308 in FIG. 3. Another example of determining the predetermined optimized transfer orbit profile 404 is described with reference to blocks 210-214 in FIG. 2A. A current maneuver plan 156 is based on the optimized transfer orbit profile 404. A current maneuver plan 156 includes but is not necessarily limited to a set of compound steering parameters 158 and when to fire one or more thrusters 104 of the apparatus 100 and when to shut off the one or more thrusters 104.

If the estimated transfer orbit 402 is approximately equal to the corresponding optimized transfer orbit 402, the method 227 advances to block 240. In block 240, the current maneuver plan 156 is maintained to minimize the electric orbit raising 400 duration.

In block 246, a variable thrust 108 based on an electric power balance 150 is determined from the current maneuver plan 156 in response to the estimated current transfer orbit being approximately equal to the corresponding optimized transfer orbit 402. The electric power balance 150 is determined each optimized transfer orbit 402. An example of determining the electric power balance on an orbit-by-orbit basis is described with reference to blocks 216-224 in FIG. 2B.

Returning to block 238, if the estimated transfer orbit 402 is not approximately equal to the corresponding optimized transfer orbit 402 of the predetermined optimized transfer orbit profile 404, the method 227 advances to block 242. In block 242, the optimized series of transfer orbits 402 of the predetermined optimized transfer orbit profile 404 are re-optimized by the apparatus 100. Re-optimizing the optimized series of transfer orbits 402 includes determining a new optimized series of transfer orbits 402 and predicting a variable thrust 108 based on an electric power balance 150 of each of the new optimized series of transfer orbits 402. In accordance with an example, the autonomous apparatus 100 includes an optimizer, such as for example optimizer 144 in FIG. 1. The optimizer 144 is configured to re-optimize the optimized series of transfer orbits 402 as described herein.

In block 244, the current maneuver plan 156 is adjusted according to the new optimized series of transfer orbits 402 to provide a new current maneuver plan 156 to minimize the electric orbit raising 400 duration.

In block 246, a variable thrust 108 based on an electric power balance 150 is determined from the new current maneuver plan 156 in response to the estimated current transfer orbit 402 not being approximately equal to the corresponding optimized transfer orbit 402 in block 238.

In block 248, a thruster 104 maneuver is executed according to a set of compound steering parameters 158 and the variable thrust 108 of the current maneuver plan 156 or new current maneuver plan 156.

In block 250, a determination is made whether the target orbit 408 has been reached by the apparatus 100. If the target orbit 408 has not been reached by the apparatus 100, the method 227 returns to block 234 and the process continues similar to that previously described until the target orbit 406 is reached. If the target orbit 406 has been reached in block 250, the thruster firings end at 252.

FIG. 2D is a flow chart of an example of a method 253 for providing optimized power balanced variable thrust transfer orbits 402 to minimize an electric orbit raising 400 duration of an apparatus 100 where the apparatus 100 is a non-autonomous or partially autonomous apparatus in accordance with a further embodiment of the present disclosure. The elements of the exemplary method 253 are separated into those elements that are embodied in and performed by the ground network 152; those elements that are embodied in and performed by the launch vehicle 502; and those elements that are embodied in and performed by the apparatus 100. Blocks 228, 230 and 232 are the same as those described in the method 227 of FIG. 2C.

In block 228, an optimized separation orbit 406 (FIG. 4) is found by using an optimizer, such as for example, multidimensional optimizer 145 in FIG. 1. An example of finding an optimized separation orbit 406 is described with reference to blocks 204-208 in FIG. 2A and blocks 302 and 304 in FIG. 3. Finding the optimized separation orbit 406 is performed prior to the launch. In one implementation, simulated launch data is used by the multidimensional optimizer 145 to determine the optimized separation orbit 406.

In block 230, parameters that optimize the separation orbit 406 are received by the launch vehicle 502. Examples of the parameters that optimize the separation orbit 406 are described with reference to blocks 314 and 316 in FIG. 3. In block 232, the apparatus 100 is launched by the launch vehicle 502 into the separation orbit 406. The parameters associated with the actual separation orbit 406 may include small errors from the simulated separation orbit 406 found by the ground network 152.

In block 254, an estimate of a current transfer orbit 402 of the apparatus 100 is determined. The estimate of the current transfer orbit 402 is determined by the apparatus 100 if the apparatus 100 includes a GPS 160. The estimate of the current transfer orbit 402 is transmitted to the ground network 152. Transfer orbit 402 data is received by the ground network 152 at preset time intervals. For example, the transfer orbit 402 data are transmitted to the ground network 152 daily. If the apparatus 100 is not equipped with a GPS 160, the ground network 152 is configured to determine the estimate of the current transfer orbit 402 using ranging data.

In block 256, optimized transfer orbits 402 are determined by the ground network 152. For example, the ground network 152 includes an optimizer, such as multidimensional optimizer 145 (FIG. 1) for example, configured to determine a series of optimized transfer orbits 402. An example of determining the optimized transfer orbits 402 by the multidimensional optimizer 135 is described with reference to blocks 306 and 308 in FIG. 3. Another example of determining the optimized transfer orbits 402 is described in blocks 210-214 of FIG. 2A. Optimizing the series of transfer orbits 402 includes predicting a variable thrust 108 based on an electric power balance 150 of each of the optimized series of transfer orbits 402 using previous knowledge and future estimates. A predetermined maneuver plan 156 is updated based on differences between the estimated transfer orbit and a corresponding optimized transfer orbit 402 of the optimized series of transfer orbits 402.

In block 258, any update to a predetermined maneuver plan 156 is sent from the ground network 152 to the apparatus 100. Updates to the predetermined maneuver plan 156 may be sent at periodic time intervals, for example, once every two weeks or any other periodic time interval depending upon circumstances and how often corrections may need to be made to the series of optimized transfer orbits 402. Updates to the predetermined maneuver plan 156 may be sent directly to the apparatus 100 or relayed to apparatus 100 through intermediary apparatuses or other control stations of the ground network 152. The predetermined maneuver plan 156 includes a set of compound steering parameters 158 and thruster maneuver times, when the one or more thrusters 104 are fired and when the one or more thrusters 104 of the apparatus 100 are shut down. The set of compound steering parameters 158 are based on an optimized variable thrust 108 and an associated electrical power balance 150 to the optimized variable thrust 108.

In block 260, a variable thrust 108 is determined by the apparatus 100 based on the electric power balance 150. As previously described, an example of determining the electric power balance is described with reference to blocks 216-224 in FIG. 2B. The current maneuver plan 156 will be continued to be performed in response to no new update to the current maneuver plan 156 being received from the ground network 152. The updated maneuver plan 156 will be performed in response to an update to the current maneuver plan 156 being received by the apparatus from the ground network 152.

In block 262, a thruster 104 maneuver is executed according to the received set of compound steering parameters 158 of the updated maneuver plan 156 and variable thrust 108 determined onboard the apparatus 100.

In block 264, a determination is made whether the target orbit 406 has been reached. The method 253 will return to block 254 in response to the target orbit 406 not having been reached. The process will continue similar to that previously described. If the target orbit 406 has been reached in block 264, the thruster firings end at 266.

FIG. 3 is a flow chart of an example of a method 300 of operation of a multidimensional optimizer 145 (FIG. 1) to minimize an electric orbit raising 400 duration of an apparatus 100 in accordance with an embodiment of the present disclosure. In accordance with the example in FIG. 3, the method 300 includes four optimization levels 302, 304, 306 and 308. A first level 302 of optimization includes optimizing the separation node 530 (FIG. 5A). A second level 304 of optimization includes optimizing the separation orbit 406 (FIG. 4, FIG. 5B) subject to separation mass constraints of the apparatus 100 as described below. A third level 306 of optimization includes optimizing each of the transfer orbits 402 (FIG. 4, FIG. 6). A fourth level 308 of optimization includes optimization of the transfer from the separation orbit 406 to the target orbit 408 (FIG. 4). At each of the optimization levels 302, 304, 306 and 308, the electric orbit raising 400 is optimized assuming the variable parameters (blocks 314, 316 and 326) at other higher optimization levels are fixed, obtaining a local minimum of electric orbit raising 400.

In one embodiment, only a subset of the optimization levels 302, 304, 306 and 308 is performed. For example, the variable parameters in block 326 are preselected and fixed, and thus the electric orbit raising 400 for level 306 is not minimized and block 328 is either bypassed or put a default yes (no optimization at level 306). Variable parameters at blocks 314 and 316 are however varied. A local electric orbit raising at levels 304 and 302 are determined despite level 306 optimization not being performed. In other examples, the optimization at 304 or 302 is bypassed and variable parameters at those levels are fixed or preselected.

In accordance with an example, any known mathematical optimization algorithm, such as a gradient descent optimization or similar optimization, is used to perform the optimizations in each optimization level 302, 304, 306 and 308. While FIG. 3 shows an example where electric orbit raising 400 is minimized in stages, in another embodiment, a single overall optimization using at least one of a subset of the variable parameters in optimization levels 302, 304 and 306 is applied and the electric orbit raising 400 is minimized in a single stage. When all variable parameters in optimization levels 302, 304 and 306 are optimized at once, an optimal value of the electric orbit raising is obtained.

Going back to the example shown in FIG. 3, the first level 302 of optimization includes orienting the separation orbit plane 516 (FIG. 5B) via selection of the right ascension of the ascending node 520 to minimize the electric orbit raising 400 duration. The first level 302 of optimization corresponds to block 206 of FIG. 2A. Input variables 310 are received and the optimization is started in the first level 302. The input variables 310 correspond to the variable parameters 148 (FIG. 1) associated with each optimization level 302-308 that are variable in each optimization level 302-308 to achieve an optimized solution (block 312 in FIG. 3) to minimize the electric orbit raising 400 duration. Examples of the variable parameters used for each optimization level 302-308 are described below with the associated optimization level 302-308.

In block 314, the separation node 530 (FIG. 5A) is optimized by varying variable parameters associated separation of the apparatus 100 from the launch vehicle 502. For example, the variable parameters include the separation orbit plane 516 (FIG. 5B) being oriented via selection of the right ascension of the ascending node 520 in FIG. 5B to minimize the electric orbit raising 400 duration.

In the second level 304 of optimization, the separation orbit 406 (FIG. 5B) is optimized subject to the separation mass (e.g. propellant 106 mass and apparatus 100 dry mass) constraints, and for a given set of variable parameters at block 314. The apparatus dry mass is the mass of the apparatus 100 without propellant 106. The second level 304 of optimization corresponds to block 208 in FIG. 2A. In block 316, the separation orbit 406 is optimized by varying variable parameters including the injection inclination angle 514 (FIG. 5B), injection apogee 518, and injection perigee 517 in the presence of a constraint, block 318. The constraint in block 318 is defined by equation 5:

$$\text{Separation Mass} = \text{Apparatus Dry Mass} + \text{Electric Propellant Mass} \qquad \text{Equation 5}$$

Where the total apparatus mass (Separation Mass) at separation from the launch vehicle 502 equals the apparatus dry mass (Apparatus Dry Mass) without the propellant 106 mass plus the propellant 106 mass (Electric Propellant Mass).

In block 318, the constraint forces a propellant 106 mass and an apparatus 100 dry mass to be compatible with the launch vehicle capabilities 146 to deliver the propellant 106 mass and the apparatus 100 dry mass to a given separation orbit 406. The goal of the second level 304 of optimization is to find the optimized combination of separation orbit variable parameters that minimizes the electric orbit raising 400 duration.

If the constraint (block 318) is not satisfied in block 320, the method 300 returns to block 316 and the variable parameters are varied to find a different combination of launch vehicle variable parameters that satisfy the constraint in block 318. If the constraint is satisfied in block 320, the method 300 advances to block 322. In block 322, if the electric orbit raising 400 duration at 304 level is not minimized, the method 300 returns to block 316 and the method 300 continues similar to that previously described. If the electric orbit raising 400 duration is minimized in block 322, the method 300 advances to block 324 to check if the electric orbit raising 400 has been minimized at the 302 level given the set of variable parameters already selected in block 314 while optimizing in level 304.

The third level 306 of optimization includes optimizing each of the transfer orbits 402 (FIG. 4) to minimize electric orbit raising 400 duration from a given separation orbit 406 to the target orbit 408 given an already selected set of variable parameters in blocks 314 and 316. The third level 306 of optimization corresponds to block 212 in FIG. 2A. In accordance with an example, optimizing each transfer orbit 402 includes making modifications to each transfer orbit 402. The modifications to each transfer orbit 402 include modifications to an orientation of the transfer orbit plane 532 (FIG. 5A) relative to the earth 412 and sun 504 throughout the electric orbit raising 400 to maximize sunlight durations 510, minimize eclipse 512 durations, and minimize the electric orbit raising 400 duration.

In block 326, each transfer orbit 402 is optimized by varying variable parameters 148 including a mass of the propellant 106 and global compound steering weight factors. Examples of compound steering laws for efficient low thrust transfer orbits and global compound steering weight factors are described in U.S. Pat. No. 8,457,810, entitled "Compound Steering Law for Efficient Low Thrust Transfer Orbit Trajectory, issued Jun. 4, 2013, assigned to the same assignee as the present application and incorporated herein by reference, and U.S. Pat. No. 8,930,048, entitled "Enhanced Compound Steering Law for General Low Thrust Mission," issued Jun. 6, 2015, assigned to the same assignee as the present application and incorporated herein by reference. Briefly, global compound steering and global compound steering weight factors include firing the variable thrusters 104 at a particular variable thrust 108 and in a particular compound steering direction 534 (FIG. 5A), as determined for each variable thrust transfer orbit 402, to minimize the electric orbit raising 400 duration at level 306 given the variable parameters in blocks 314 and 316.

In block 328, a determination is made whether the electric orbit raising 400 duration is minimized by the optimization in the third level 306 of optimization. If not, the method 300 will return to block 326 and the variable parameters 148 in block 326 are varied until an optimized transfer orbit 402 that minimizes the electric orbit raising 400 duration in block 328 is found. If the determination is made in block 328 that the electric orbit raising 400 duration is minimized by the optimized transfer orbit 402 at the third level 306 and given the selected variable parameters at blocks 314 and 316 and the optimized parameters in 326, the method 300 returns to block 320 and the method 300 proceeds similar to that previously described.

The fourth level 308 of optimization includes optimizing the variable thrust 108 (FIG. 1) generated by the variable thrusters 104 during each transfer orbit 402 (FIG. 4) to make progress from the separation orbit 406 toward the target orbit 408. The fourth level 308 of optimization corresponds to block 216 in FIG. 2B. Variable thrust 108 and compound steering are used in the fourth level 308 of optimization. In block 330, the apparatus 100 propagates to a next transfer orbit 402 for a next variable thruster maneuver.

In block 332, a variable thrust 108 is determined from the electric power balance 150. In accordance with an embodiment, the electric power balance 150 is determined from block 216 in FIG. 2B. In block 336, compound steering parameters are optimized. Examples of compound steering parameters are described in U.S. Pat. Nos. 8,457,810 and 8,930,048. Briefly described, the compound steering parameters define the compound steering direction 534 and amount of variable thrust 108 each transfer orbit 402 and are optimized to minimize the electric orbit raising 400 duration.

In block 338, a determination is made whether the target orbit 408 (FIG. 4) has been reached. If not, the method 300 returns to block 330 and the apparatus 100 propagates to a position in the next transfer orbit 402 to perform a variable thruster 104 maneuver and the method 300 will proceed as previously described. If the target orbit 408 has been reached in block 338, the method 300 will advance to block 328 and the method 300 will proceed as previously described. If all optimization levels 302, 304, 306 and 308 have been successfully performed, the method 300 advances to block 312 and an optimized solution that minimized the electric orbit raising 400 duration is achieved.

Figure 7:
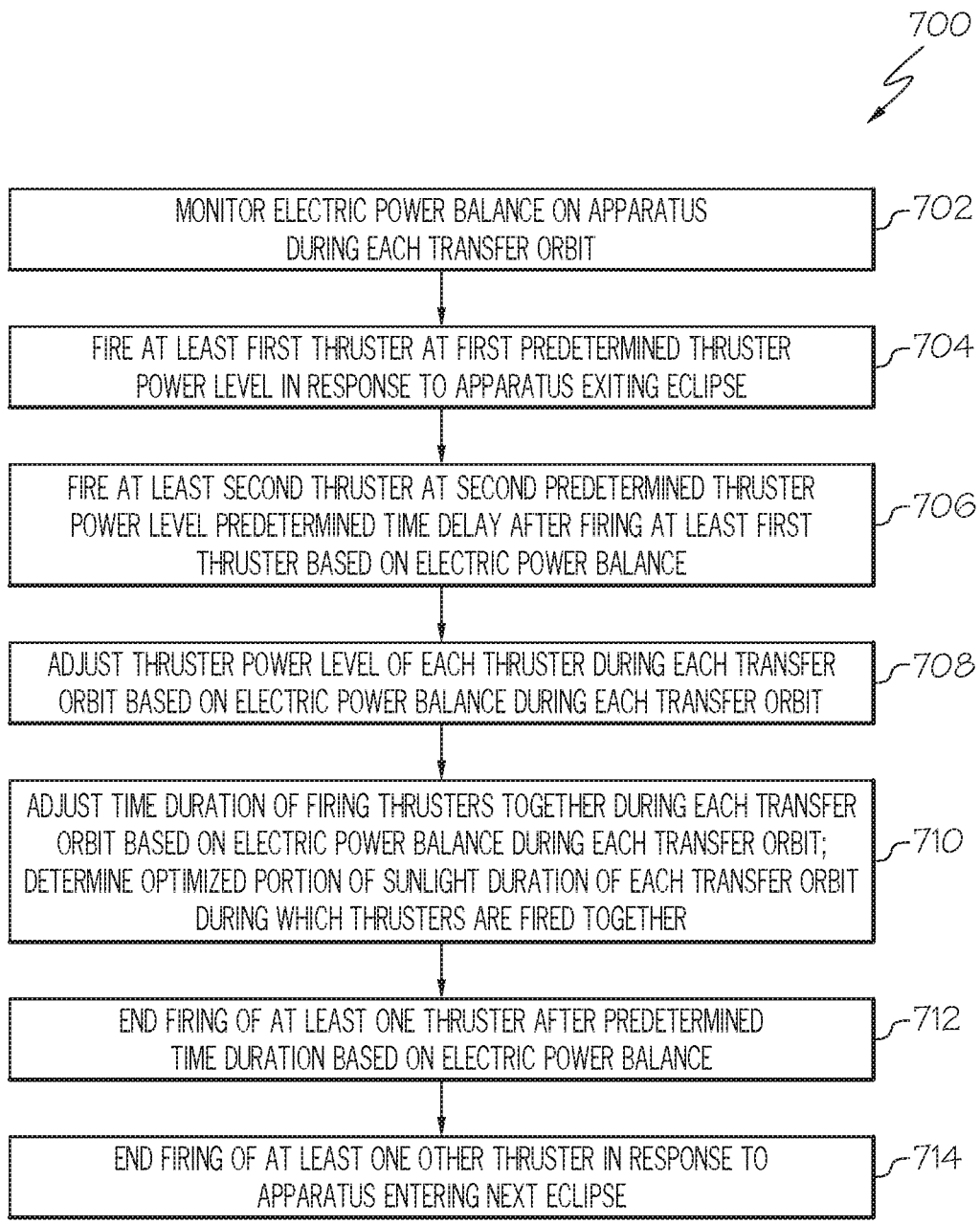
FIG. 7 is a flow chart of an example of a method for providing optimized power balanced low thrust transfer orbits utilizing split thruster execution to minimize electric orbit raising of an apparatus in accordance with an embodiment of the present disclosure.

FIG. 7 is a flow chart of an example of a method 700 for providing optimized power balanced low thrust transfer orbits 402 (FIG. 8) utilizing split thruster execution to minimize electric orbit raising 400 of an apparatus 100 in accordance with an embodiment of the present disclosure. In accordance with an embodiment, the method 700 is embodied in and performed by an apparatus, such as apparatus 100 in FIG. 1. In another embodiment, the method 700 is embodied in and performed at least partially by a ground network, such as ground network 152 in FIG. 1. In a further embodiment, portions of the method 700 are embodied in and performed by the apparatus 100 and portions of the method 700 are embodied in and performed by the ground network 152.

In block 702, electric power balance 150 on the apparatus 100 is monitored during each transfer orbit 402 of a plurality of transfer orbits 402 of the electric orbit raising 400. An example of determining the electric power balance 150 during each transfer orbit 402 was previously described with reference to blocks 216-224 of FIG. 2B.

Figure 8:
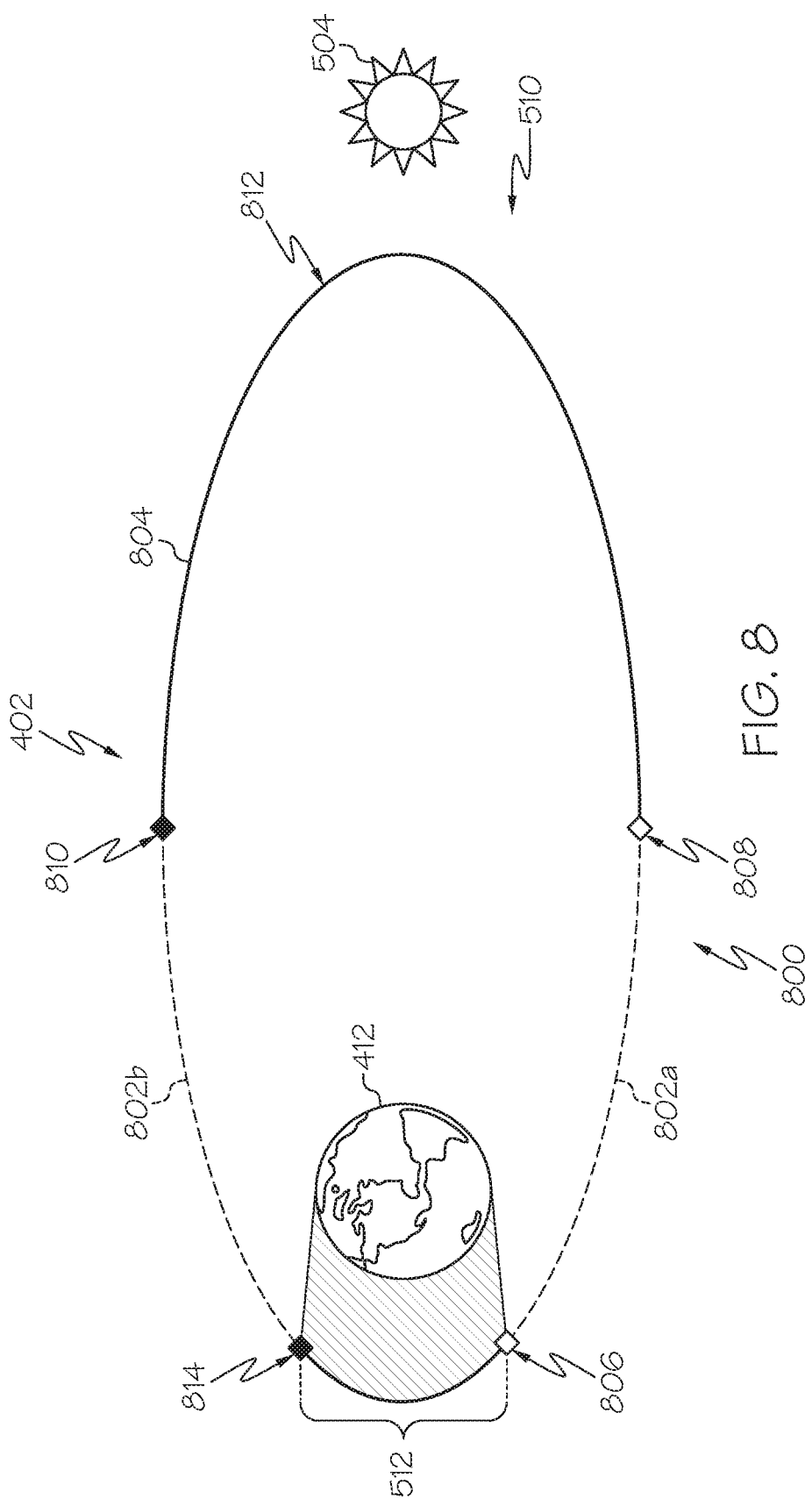
FIG. 8 is an illustration of an example of an optimized low thrust transfer orbit utilizing split thruster execution to minimize electric orbit raising of an apparatus in accordance with an embodiment of the present disclosure.
Figure 9:
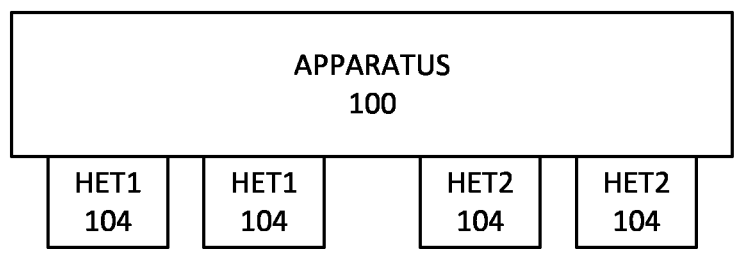
FIG. 9 is a block schematic diagram of an example of the apparatus in FIG. 1 in accordance with another embodiment of the present disclosure.

In block 704, a first thruster 104 is fired in response to the apparatus 100 exiting an eclipse 512 and based on the electric power balance 150. In accordance with an example, firing the first thruster 104 includes firing more than one first thruster 104. Referring also to FIG. 9, FIG. 9 is an example of the apparatus 100 that includes more than one first thruster (HET1) 104 and more than one second thruster (HET2) 104. Referring also to FIG. 8, FIG. 8 is an illustration of an example of an optimized low thrust transfer orbit 402 utilizing split thruster execution 800 to minimize electric orbit raising 400 of the apparatus 100 in accordance with an embodiment of the present disclosure. The split thruster execution 800 is illustrated by a broken line 802 when a first thruster 104 is firing during the transfer orbit 402 and a solid line 804 when the first thruster 104 and a second thruster 104 are firing together between locations 808 and 810 of the transfer orbit 402. In the example illustrated in FIG. 8, the first thruster 104 begins firing at location 806 after the apparatus 100 exits the eclipse 512 and enters the sunlight duration 510 of the transfer orbit 402. In another example, the location 806 is not immediately after the apparatus 100 exits the eclipse 512 and is at a different location along the transfer orbit 402 based on optimization of firing the thrusters 104 as described below with reference to block 710.

In block 706, a second thruster 104 is fired a predetermined time delay after firing the first thruster 104 and based on the electric power balance 150. In accordance with an example, firing the second thruster 104 includes firing more than one second thruster 104. In the example illustrated in FIG. 8, the second thruster 104 begins firing at location 808 of the transfer orbit 402 and fires in combination with the first thruster 104. The location for 808 for commencing firing the second thruster 104 in combination with the first thruster 104 is based on the optimization of firing the thrusters 104 as described below. The first thruster 104 and the second thruster 104 are fired together for a predetermined time duration according to Equation 6 below which corresponds to location 810 of the transfer orbit 402 in the example of FIG. 8.

The first thruster 104 is fired at a first predetermined power level and the second thruster 104 is fired at a second predetermined power level. In accordance with an embodiment, the first predetermined thruster power level and the second predetermined thruster power level are about equal and are adjusted during firing to maintain the electric power balance 150. In another embodiment, the first predetermined thruster power level and the second predetermined thruster power level are different power levels and are adjusted during firing to maintain the electric power balance 150. In accordance with a further embodiment, the first thruster power level and the second thruster power level are about a maximum thruster power level for each thruster 104 during firing.

In block 708, the thruster power level of each thruster 104 is adjusted during each transfer orbit 402 based on the electric power balance 150 during each transfer orbit 402. The thruster power level of each thruster 104 is adjusted to maintain the electric power balance 150 during each transfer orbit 402.

In block 710, a time duration of firing the thrusters 104 together is adjusted during each transfer orbit 402 based on the electric power balance 150 during each transfer orbit 402. In accordance with an embodiment, an optimized portion 812 of a sunlight duration 510 of each transfer orbit 402 is determined during which the thrusters 104 are fired together (solid line in FIG. 8). The optimized portion 812 is based on the time duration during which both thrusters 104 are fired together. The optimized portion 812 may move anywhere in the transfer orbit 402 as a result of the optimization. In accordance with an example, an optimized time duration for firing the thrusters 104 together is determined using Equation 6:

$$t_2 = \frac{(CR_{max}t_{sun} - t_{ecl}\text{load}_{ecl}C_{losses})}{CR_{max} + \text{load}_{sun}C_{losses} + (2P_{thruster\_max} - P_{solar\_energy})C_{losses}} \quad \text{Equation 6}$$

Where:
$CR_{max}$ is the maximum charge rate to the battery 138 in watts.

$$C_{losses} = \frac{1}{(1 - \text{loss}_{charge})(1 - \text{loss}_{discharge})} \text{ (unitless).}$$

$P_{thruster\_max}$ is the maximum power limit of the thrusters 104 in watts.
$t_{sun}$ is the sunlight duration 510 of a particular transfer orbit 402 based on the orbit geometry.

$\text{load}_{ecl}$ is the load connected to the battery 138 during the eclipse 512.
$t_{ecl}$ is the duration of the eclipse 512.
$P_{solar\_array}$ is the available electric power 130 from at least one of the solar arrays 126a or 126b.
$\text{load}_{sun}$ are other loads drawing electric power 130 from the solar arrays 126 during the sunlight duration 510 of each transfer orbit 402.

The total time duration for firing only one thruster 104 is determined by Equation 7:

$$t_1 = t_{sun} - t_2 \quad \text{Equation 7}$$

In accordance with the example illustrated in FIG. 8, the total time $t_1$ duration for firing only one thruster is split into two segments 802a and 802b (dashed lines). In another example, the total time $t_1$ may be a single segment of the transfer orbit 402. The single segment may be at different locations along the transfer orbit 402 based on the optimization.

Referring back to FIG. 7, in block 712, firing one of the first thruster 104 or the second thruster 104 ends after the predetermined time duration $t_2$ for firing the thrusters 104 together based on the electric power balance 150. The end of the predetermined time duration $t_2$ corresponds to location 810 in the example in FIG. 8.

In block 714, firing the other of the first thruster 104 or the second thruster 104 ends in response to the apparatus 100 entering a next eclipse 512. In the example in FIG. 8, firing of the other thruster 104 ends at location 814 proximate entering the next eclipse 512. In accordance with another example, firing the other thruster 104 ends at a location of the transfer orbit 402 before entering the next eclipse 512. In accordance with a further embodiment, firing at least one of the thrusters 104 continues at least partially into the next eclipse 512.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method to minimize an electric orbit raising duration of an apparatus, the method comprising:
   monitoring an electric power balance onboard the apparatus during each transfer orbit of a plurality of transfer orbits of the electric orbit raising, wherein the electric power balance comprises a balance between electric power supplied by one or more solar arrays to at least one of a plurality of thrusters and electric power supplied by the one or more solar arrays to at least recharge a battery of the apparatus during a sunlight duration of each transfer orbit;
   firing a first thruster of the plurality of thrusters in response to the apparatus exiting an eclipse and based on the electric power balance;
   firing a second thruster of the plurality of thrusters at a predetermined time delay after firing the first thruster and based on the electric power balance;
   ending firing one of the first thruster or the second thruster after a predetermined time duration based on the electric power balance; and
   ending firing another of the first thruster or the second thruster in response to the apparatus entering a next eclipse.

2. The method of claim 1, wherein firing the first thruster comprises firing the first thruster at a first predetermined thruster power level and firing the second thruster comprises firing the second thruster at a second predetermined thruster power level.

3. The method of claim 2, wherein the first predetermined thruster power level and the second predetermined thruster power level are about equal.

4. The method of claim 2, wherein the first predetermined thruster power level and the second predetermined thruster power level are about a maximum thruster power level.

5. The method of claim 1, further comprising adjusting a thruster power level of each thruster during each transfer orbit based on the electric power balance during each transfer orbit.

6. The method of claim 1, further comprising adjusting a time duration of firing the thrusters together during each transfer orbit based on the electric power balance during each transfer orbit.

7. The method of claim 1, further comprising determining a time duration of each transfer orbit during which the thrusters are fired together.

8. The method of claim 1, further comprising firing at least one of the thrusters at least partially into the next eclipse.

9. The method of claim 1, wherein firing the first thruster comprises firing more than one first thruster.

10. The method of claim 1, wherein firing the second thruster comprises firing more than one second thruster.

11. The method of claim 1, wherein monitoring the electric power balance, firing the first thruster and the second thruster and ending firing the first thruster and the second thrusters is controlled by control electronics on the apparatus.

12. The method of claim 1, wherein monitoring the electric power balance, firing the first thruster and the second thruster and ending firing the first thruster and the second thruster is controlled at least partially by a ground network.

13. An apparatus configured to minimize an electric orbit raising duration of the apparatus, the apparatus comprising:
   one or more solar arrays to provide electric power;
   a plurality of thrusters to transfer the apparatus from one transfer orbit to a next transfer orbit during the electric orbit raising to reach a target orbit;
   control electronics comprising a processor, the processor being configured to:
   monitor an electric power balance onboard the apparatus during each transfer orbit of a plurality of transfer orbits of the electric orbit raising, wherein the electric power balance comprises a balance between electric power supplied by one or more solar arrays to at least one of the plurality of thrusters and electric power supplied by the one or more solar arrays to at least recharge a battery of the apparatus during a sunlight duration of each transfer orbit;
   fire a first thruster of the plurality of thrusters in response to the apparatus exiting an eclipse and based on the electric power balance;
   fire a second thruster of the plurality of thrusters at a predetermined time delay after firing the first thruster and based on the electric power balance;
   end firing one of the first thruster or the second thruster after a predetermined time duration based on the electric power balance; and
   end firing another of the first thruster or the second thruster in response to the apparatus entering a next eclipse.

14. The apparatus of claim 13, wherein the first thruster is fired at a first predetermined thruster power level and the second thruster is fired at a second predetermined thruster power level.

15. The apparatus of claim 14, wherein the first predetermined thruster power level and the second predetermined thruster power level are about equal.

16. The apparatus of claim 14, wherein the first predetermined thruster power level and the second predetermined thruster power level are about a maximum thruster power level.

17. The apparatus of claim 13, wherein the control electronics are further configured to adjust a thruster power level of each thruster during each transfer orbit based on the electric power balance during each transfer orbit.

18. The apparatus of claim 13, wherein the control electronics are further configured to adjust a time duration of firing the thrusters together during each transfer orbit based on the electric power balance during each transfer orbit.

19. The apparatus of claim 13, wherein the control electronics are further configured to determine a time duration of each transfer orbit during which the thrusters are fired together.

20. The apparatus of claim 13, wherein at least one of the thrusters is fired at least partially into the next eclipse.

* * * * *